United States Patent
Taki

(10) Patent No.: US 12,505,540 B2
(45) Date of Patent: Dec. 23, 2025

(54) RADIATION IMAGE ANALYSIS DEVICE, METHOD OF OPERATING RADIATION IMAGE ANALYSIS DEVICE, AND NON-TRANSITORY COMPUTER READABLE MEDIUM

(71) Applicant: FUJIFILM Corporation, Tokyo (JP)

(72) Inventor: Tomoko Taki, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 431 days.

(21) Appl. No.: 18/175,415

(22) Filed: Feb. 27, 2023

(65) Prior Publication Data
US 2023/0274426 A1  Aug. 31, 2023

(30) Foreign Application Priority Data
Feb. 28, 2022 (JP) ................. 2022-029806

(51) Int. Cl.
G06T 7/00 (2017.01)
A61B 6/50 (2024.01)
G06T 3/60 (2024.01)
G06T 7/70 (2017.01)
G06V 10/22 (2022.01)
G06V 20/50 (2022.01)

(52) U.S. Cl.
CPC ............ *G06T 7/0012* (2013.01); *A61B 6/505* (2013.01); *G06T 3/60* (2013.01); *G06T 7/70* (2017.01); *G06V 10/22* (2022.01); *G06V 20/50* (2022.01); *G06T 2207/10116* (2013.01); *G06T 2207/30008* (2013.01); *G06V 2201/033* (2022.01)

(58) Field of Classification Search
None
See application file for complete search history.

(56) References Cited

U.S. PATENT DOCUMENTS

2005/0096527 A1* 5/2005 Zeller ................... A61B 6/505
                                                                600/407
2016/0242722 A1   8/2016 Adachi et al.

FOREIGN PATENT DOCUMENTS

JP  2015-065999 A  4/2015
WO  2017/026046 A1  2/2017

OTHER PUBLICATIONS

Yun Kyung Jeon, Myung Jun Shin, Yong Beom Shin, Choong Rak Kim, Seong-Jang Kim, Hyun Yoon Ko, In Joo Kim, Effect of increased axial rotation angle on bone mineral density measurements of the lumbar spine, The Spine Journal, vol. 14, Issue 9, 2014, pp. 2150-2154, ISSN 1529-9430, (Year: 2014).*

* cited by examiner

*Primary Examiner* — SJ Park
*Assistant Examiner* — Caroline E. Depalma
(74) *Attorney, Agent, or Firm* — Studebaker Brackett PLLC

(57) ABSTRACT

The radiation image analysis device acquires an X-ray image obtained by performing X-ray radiography on a subject including a bone part, acquires a rotation angle from a reference position of the bone part on the basis of the X-ray image, and acquires bone quantity information of the bone part by correcting pre-correction bone quantity information of the bone part obtained by converting a pixel value for each pixel of the X-ray image on the basis of the rotation angle.

11 Claims, 15 Drawing Sheets

RADIATION IMAGE ANALYSIS DEVICE, METHOD OF OPERATING RADIATION IMAGE ANALYSIS DEVICE, AND NON-TRANSITORY COMPUTER READABLE MEDIUM

CROSS-REFERENCE TO RELATED APPLICATIONS

This application claims priority under 35 U.S.C § 119(a) to Japanese Patent Application No. 2022-029806 filed on 28 Feb. 2022. The above application is hereby expressly incorporated by reference, in its entirety, into the present application.

BACKGROUND OF THE INVENTION

1. Field of the Invention

The present invention relates to a radiation image analysis device that acquires bone quantity information from a radiation image, a method of operating the radiation image analysis device, and a non-transitory computer readable medium.

2. Description of the Related Art

In the medical field, bone mineral density is measured by radiography. The bone mineral density is used as important data for follow-up observation of diagnosis or treatment of osteoporosis. For example, according to an examination performed by a dual energy X-ray absorptiometry (DXA) method, it is possible to obtain a radiation image in which a bone part is selectively captured. With an image of the bone part captured in this radiation image, information on bone quantity indicating the density of minerals contained in the bone part is obtained by using the fact that the brightness (pixel value) in each pixel of the image is related to the bone quantity. The bone quantity is also referred to as a bone mineral content, a bone mineral density, or the like.

A method of obtaining the bone quantity more accurately by radiography is disclosed. For example, in order to improve the reproducibility of the examination performed by imaging, there is disclosed a bone mineral density measuring device including a fixture that fixes the angle of a leg part of a subject with respect to an X-ray radiography system in an adjustable manner, and a registration unit that registers the angle of the leg part (WO2017/026046A). Additionally, there is disclosed a bone mineral density measuring device capable of correcting the direction of a region of interest for measuring the bone mineral density of a bone of a forearm, thereby accurately setting a region of interest (JP2015-065999A (corresponding to US2016/242722A1)).

SUMMARY OF THE INVENTION

In the method of fixing a position such as the angle of a subject, there is a concern that it takes substantial time to fix the subject at a correct position, and there is a concern that the bone quantity can be accurately compared between radiation images captured at different positions. Additionally, in the method of correcting the direction of the region of interest, there is a concern that it is impossible to cope with a case where the region of interest deviates three-dimensionally.

An object of the present invention is to provide a radiation image analysis device capable of easily measuring a bone quantity at a certain reference by using a radiation image, a method of operating the radiation image analysis device, and a non-transitory computer readable medium.

A radiation image analysis device according to an aspect of the present invention is a radiation image analysis device comprising a processor, in which the processor is configured to acquire a radiation image obtained by performing radiography of a subject including a bone part, acquire a rotation angle from a reference position of the bone part on the basis of the radiation image, and acquire bone quantity information of the bone part by correcting pre-correction bone quantity information of the bone part obtained by converting a pixel value for each pixel of the radiation image on the basis of the rotation angle.

Preferably, the radiation image is obtained by imaging the subject at a frontal position.

Preferably, the bone part is a proximal thighbone part.

Preferably, the bone part includes a preset part, and the processor is configured to acquire the rotation angle on the basis of a part image of the part captured in the radiation image.

Preferably, the bone part is a right or left proximal thighbone part, and the part is a lesser trochanter.

Preferably, the processor is configured to obtain a lesser trochanter distance, which is a distance between an apex of the lesser trochanter and a tangential line touching an inside of a thighbone included in the proximal thighbone part, on the basis of the part image, and acquire the rotation angle on the basis of the lesser trochanter distance.

Preferably, the processor is configured to acquire rotation angle correspondence information in which the lesser trochanter distance corresponds to the rotation angle, and acquire the rotation angle on the basis of the lesser trochanter distance and the rotation angle correspondence information.

Preferably, the processor is configured to acquire correction coefficient correspondence information in which the rotation angle corresponds to a correction coefficient for correcting the pre-correction bone quantity information, and correct the pre-correction bone quantity information on the basis of the rotation angle and the correction coefficient correspondence information.

Preferably, a trained model capable of estimating and outputting an estimation result related to the rotation angle by inputting input information including the radiation image is further included, the trained model has a parameter for outputting the estimation result on the basis of the input information, and the processor is configured to acquire the rotation angle from the estimation result output by using the trained model.

Preferably, the processor is configured to estimate a scattered ray component for each pixel on the basis of a body thickness distribution of the subject and remove the scattered ray component from the radiation image, in a case where the radiation image is acquired.

Preferably, the bone part includes a cortical bone and a spongy bone, and the processor is configured to recognize a region of the cortical bone and a region of the spongy bone in the bone part captured in the radiation image, acquire pre-correction cortical bone quantity information on the basis of the region of the cortical bone and acquire pre-correction spongy bone quantity information on the basis of the region of the spongy bone, and acquire cortical bone quantity information by correcting the pre-correction cortical bone quantity information on the basis of the rotation angle and acquire spongy bone quantity information by correcting the pre-correction spongy bone quantity information on the basis of the rotation angle.

Preferably, the processor is configured to acquire a reference value of the bone quantity information on the basis of the radiation image obtained by performing radiography of a phantom having a known bone quantity, acquire bone quantity correspondence information in which the known bone quantity corresponds to the reference value of the bone quantity information, and acquire the bone quantity from the bone quantity information on the basis of the bone quantity correspondence information.

A method of operating a radiation image analysis device according to another aspect of the present invention comprises a step of acquiring a radiation image obtained by performing radiography of a subject including a bone part; a step of acquiring a rotation angle from a reference position of the bone part on the basis of the radiation image; and a step of acquiring bone quantity information of the bone part by correcting pre-correction bone quantity information of the bone part obtained by converting a pixel value for each pixel of the radiation image on the basis of the rotation angle.

A non-transitory computer readable medium storing a computer-executable program for analyzing a radiation image according to still another aspect of the present invention causes a computer to execute a function of acquiring a radiation image obtained by performing radiography of a subject including a bone part, a function of acquiring a rotation angle from a reference position of the bone part on the basis of the radiation image, and a function of acquiring bone quantity information of the bone part by correcting pre-correction bone quantity information of the bone part obtained by converting a pixel value for each pixel of the radiation image on the basis of the rotation angle.

According to the present invention, the bone quantity at a certain reference can be easily measured by using the radiation image.

BRIEF DESCRIPTION OF THE DRAWINGS

FIG. 2A shows a case where the rotation angle is minus 20°, FIG. 2B shows a case where the rotation angle is plus or minus 0°, and FIG. 2C shows a case where the rotation angle is plus 20°.

FIG. 3 is an explanatory diagram illustrating a lesser trochanter distance a.

FIG. 4A shows a case where the rotation angle is minus 20°, FIG. 4B shows a case where the rotation angle is plus or minus 0°, and FIG. 4C shows a case where the rotation angle is plus 20°.

DESCRIPTION OF THE PREFERRED EMBODIMENTS

Figure 1:
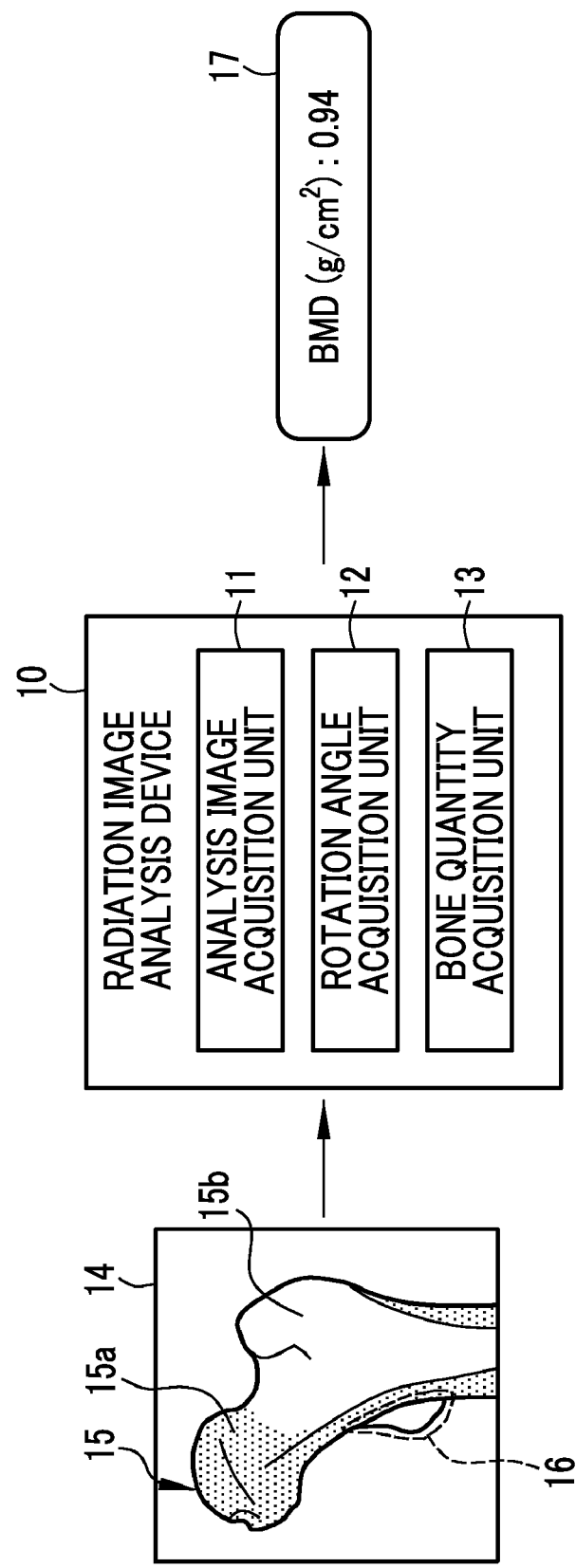
FIG. 1 is an explanatory diagram illustrating the functions of a radiation image analysis device.

An example of the basic configuration of the present invention will be described. As shown in FIG. 1, a radiation image analysis device (hereinafter, referred to as an analysis device) 10 according to the embodiment of the present invention comprises an analysis image acquisition unit 11, a rotation angle acquisition unit 12, and a bone quantity acquisition unit 13.

The analysis image acquisition unit 11 acquires a radiation image obtained by performing radiography of a subject including a bone part. The radiography may be performed as long as it is possible to obtain a radiation image in which the bone part is captured by using radiation. Therefore, the radiography includes simple imaging and contrast imaging using radiation such as X-rays, and imaging using the DXA method or the like. Additionally, the radiation image obtained by performing the radiography may be any radiation image in which the bone part is captured, and includes an image after various image processing is performed using the obtained radiation image, an image after image combination, or the like is performed using a plurality of radiation images, and the like in addition to a radiation image directly obtained by the radiography. In the present embodiment, simple X-ray radiography is performed as the radiography, and the analysis image acquisition unit 11 acquires a simple X-ray image (hereinafter, referred to as an X-ray image) 14 as the radiation image.

In the present embodiment, the analysis image acquisition unit 11 acquires an X-ray image 14 in which a proximal thighbone part of a thighbone 15 is a subject as the bone part. The proximal thighbone part includes a lesser trochanter 16. The X-ray image 14 is obtained by imaging a left proximal thighbone part at an anterior-posterior frontal dorsal position (AP), which is a frontal position, without strictly adjusting positioning. In FIG. 1, in the X-ray image 14, a region 15a in which white appears dark is shown in shading, and a region 15b in which white appears light is shown without shading.

Since the X-ray image 14 acquired by the analysis image acquisition unit 11 is for acquiring bone quantity information by performing analysis on the basis of the X-ray image 14, it is preferable that the bone part captured in the X-ray image 14 is a part captured by reflecting only the bone part while various influences are excluded. In the present embodiment, the analysis image acquisition unit 11 acquires the X-ray image 14 that has undergone image processing as a radiation image so that only the bone part is reflected and captured as much as possible. In addition, the X-ray image 14 acquired by the analysis image acquisition unit 11 may not be subjected to the image processing. Hereinafter, the X-ray image 14 includes the X-ray image 14 after the image processing has been performed and the X-ray image 14 that is not subjected to the image processing.

Additionally, in the present specification, the "bone quantity" means the same as the bone mineral content or bone mineral density (BMD), and the unit is g/cm$^2$.

The rotation angle acquisition unit 12 acquires a rotation angle from a reference position of the bone part on the basis of the X-ray image 14. In the present embodiment, the rotation angle of the thighbone 15 from the reference position is acquired on the basis of the X-ray image 14. The reference position of the bone part is one predetermined position. In the present embodiment, in a case where the thighbone 15 on either left or right side is imaged at the anterior-posterior frontal dorsal position, generally preferred positioning is set to the reference position. For example, positioning in which a pelvic frontal plane is made horizontal, a hip joint part on a side to be imaged is aligned with the center of an image receiving surface, and the lower limbs are at an extended position and at a slight internal rotation is set to the reference position.

The rotation angle refers to the rotation angle of a rotatable bone part in the positioning of the bone part during imaging. Therefore, the rotation angle of the bone part from the reference position is the rotation angle from the reference position in a case where the thighbone 15 is internally rotated or externally rotated from the reference position due to the rotation of the lower limbs, or the like in a case where the bone part is the thighbone 15.

Figure 2C:
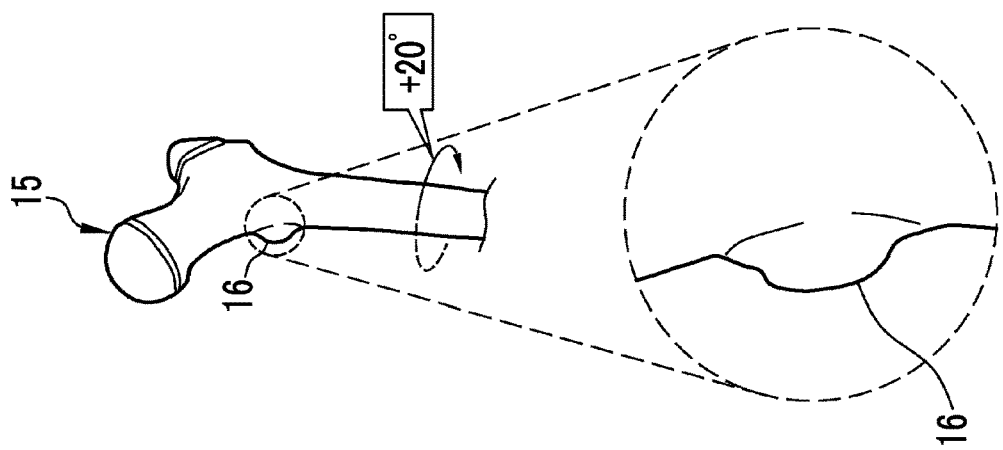
FIGS. 2A to 2C are explanatory diagrams illustrating a relationship between the shape of a lesser trochanter and the rotation angle of a thighbone in an X-ray image.
Figure 2B:
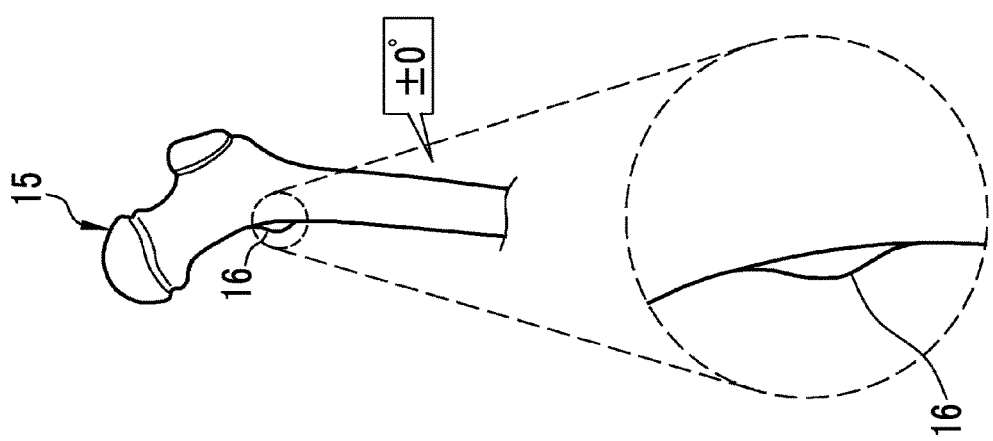
Figure 2A:
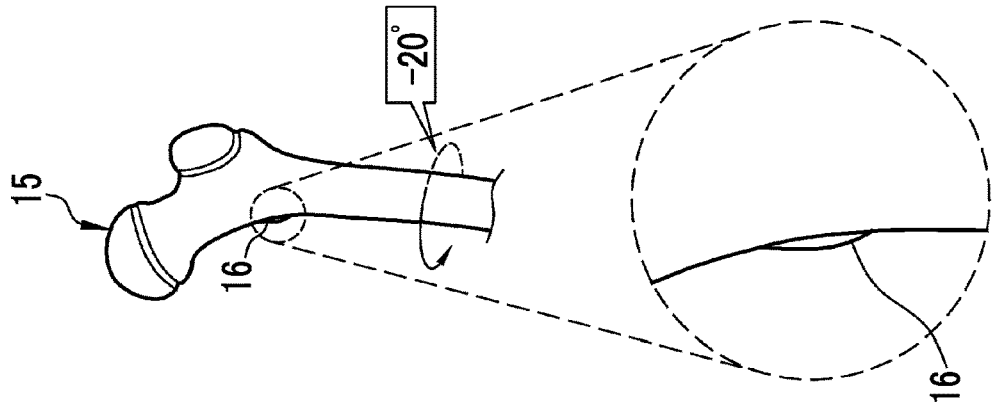

As shown in FIG. 2B, a rotation angle in a case where the thighbone 15 is at the reference position in the X-ray image 14 is set to 0°. In this case, the lesser trochanter 16 is captured on the X-ray image 14. In addition, in FIGS. 2A, 2B, and 2C, a portion including the lesser trochanter 16 captured in the X-ray image 14 is shown in an enlarged manner at a lower part of each figure. As shown in FIG. 2A, in a case where the thighbone 15 is internally rotated and, for example, the rotation angle from the reference position is −20°, the shape of the lesser trochanter 16 captured in the X-ray image 14 is a smaller shape. In addition, the rotation angle of the internal rotation is represented by a negative angle, and the rotation angle of the external rotation is represented by a positive angle. On the other hand, as shown in FIG. 2C, in a case where the thighbone 15 is externally rotated and, for example, the rotation angle from the reference position is 20°, the hidden lesser trochanter 16 can be seen from the front surface. Therefore, the shape of the lesser trochanter 16 captured in the X-ray image 14 is a remarkably large shape.

The bone quantity is calculated on the basis of a pixel value of the X-ray image 14. In addition, since the pixel value is a value representing a shade of color and the X-ray image 14 is a monochrome image, there is also a case where the pixel value is generally referred to as a brightness value or a contrast. The subject has a bone part and a soft part present around the bone part. From the law of an exponential function of attenuation in radiation, the pixel value of a bone region, which is a region where the bone part is captured in a radiation image, is determined as the product of a difference between a linear attenuation coefficient of the bone part and a linear attenuation coefficient of the soft part and the thickness of the bone part. Additionally, the linear attenuation coefficient of the bone part is a function of the density of mineral components of the bone part. Therefore, the pixel value of the bone region in the radiation image can be converted into the bone quantity, but in the X-ray images 14 captured at different rotation angles, there is a case where the calculated bone quantity is different even for the same bone part.

As a method of acquiring the rotation angle, a method based on an acquired radiation image can be used. For example, in a radiation image in which the bone part is imaged at the reference position and a radiation image in which the same bone part in a measurement target is imaged, a method of obtaining a rotation angle from a change in the shape of a part in a part image of the bone part captured in each radiation image is mentioned. Alternatively, a method of using a trained model in which a learning model is trained by a radiation image to which correct answer data of the rotation angle is given, and inputting a radiation image obtained by imaging the same bone part in the measurement target to the trained model to obtain a rotation angle may be used.

In the present embodiment, the rotation angle is obtained from a change in the shape of the lesser trochanter 16 that is a part of the thighbone 15 captured in the X-ray image 14 that is a radiation image. As the change in shape, for example, a distance between an apex of the lesser trochanter 16 and a tangential line touching the inside of the thighbone included in the thighbone 15 is set to a lesser trochanter distance on the basis of the part image of the lesser trochanter 16 captured in the X-ray image 14, and this lesser trochanter distance can be used.

Figure 3:
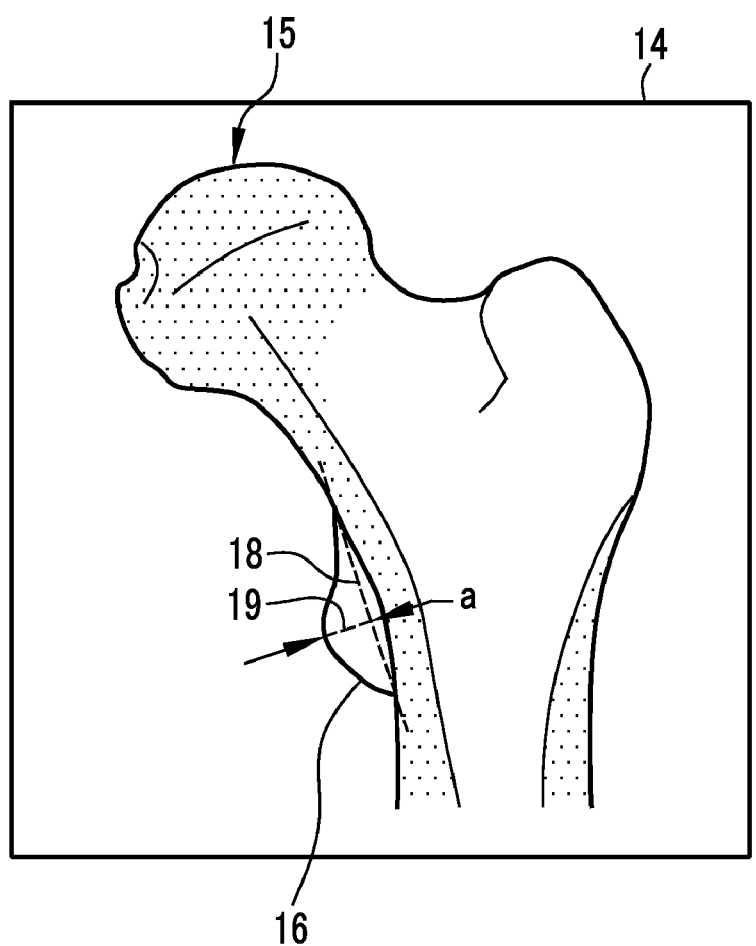

As shown in FIG. 3, specifically, as for a lesser trochanter distance a, a tangential line 18 is set to the inside of the thighbone in the vicinity of a portion where the lesser trochanter 16 is formed in a part image of a part of the X-ray image 14 in which the lesser trochanter 16 is captured, and a perpendicular line 19 is set to the tangential line 18 from the apex of the lesser trochanter 16. The distance from the apex of the lesser trochanter to an intersection point of the perpendicular line 19 and the tangential line 18 is defined as the lesser trochanter distance a. The lesser trochanter distance a is a distance between the apex of the lesser trochanter 16 and the tangential line 18.

Figure 4A:
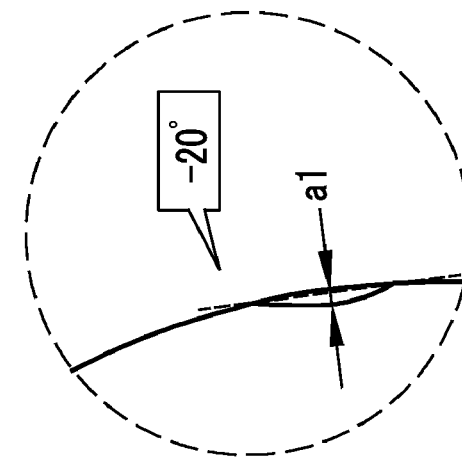
FIGS. 4A to 4C are explanatory diagrams illustrating that the lesser trochanter distance a in the X-ray image changes depending on the rotation angle of the thighbone.
Figure 4B:
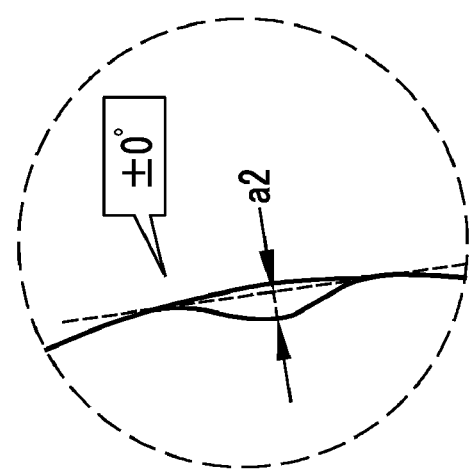
Figure 4C:
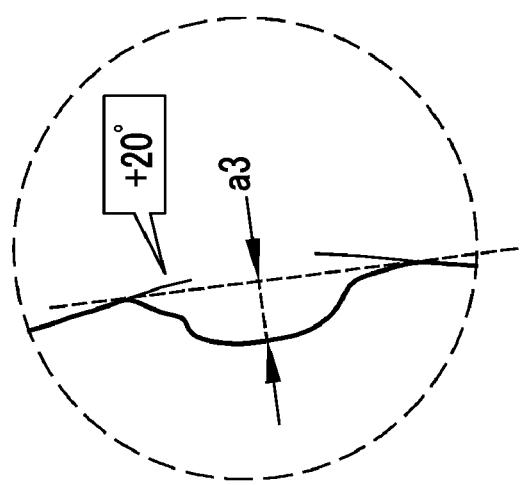

As shown in FIG. 4B, the lesser trochanter distance a in a case where the thighbone 15 is at the reference position is a distance a2, whereas as shown in FIG. 4A, the lesser trochanter distance in a case where the thighbone 15 is internally rotated by 20° from the reference position is a distance a1 smaller than the distance a2. On the other hand, as shown in FIG. 4C, the lesser trochanter distance in a case where the thighbone 15 is externally rotated by 20° from the reference position is a distance a3 larger than the distance a2.

The lesser trochanter distance a measured on the basis of the X-ray image 14 can be converted into a rotation angle by using rotation angle correspondence information in which the lesser trochanter distance a and the rotation angle, which are created in advance, correspond to each other. In addition, the rotation angle correspondence information may be a relational expression obtained by performing a polynomial approximation or the like from the lesser trochanter distance a actually measured in the X-ray image 14 captured in a case where the thighbone 15 is at a known rotation angle and the rotation angle, may be a look up table (LUT), or the like. In the present embodiment, the relational expression is used. The present inventors have found that the lesser trochanter distance a can be converted into a rotation angle while suppressing individual differences according to the rotation angle correspondence information. That is, a subject that is a target actually measured for obtaining the rotation angle correspondence information and a subject captured in a radiation image for which the rotation angle is to be obtained using the rotation angle correspondence information may be the same or may be different from each other. Therefore, it is preferable to convert the lesser trochanter distance a into a rotation angle by using the rotation angle correspondence information.

Figure 5:
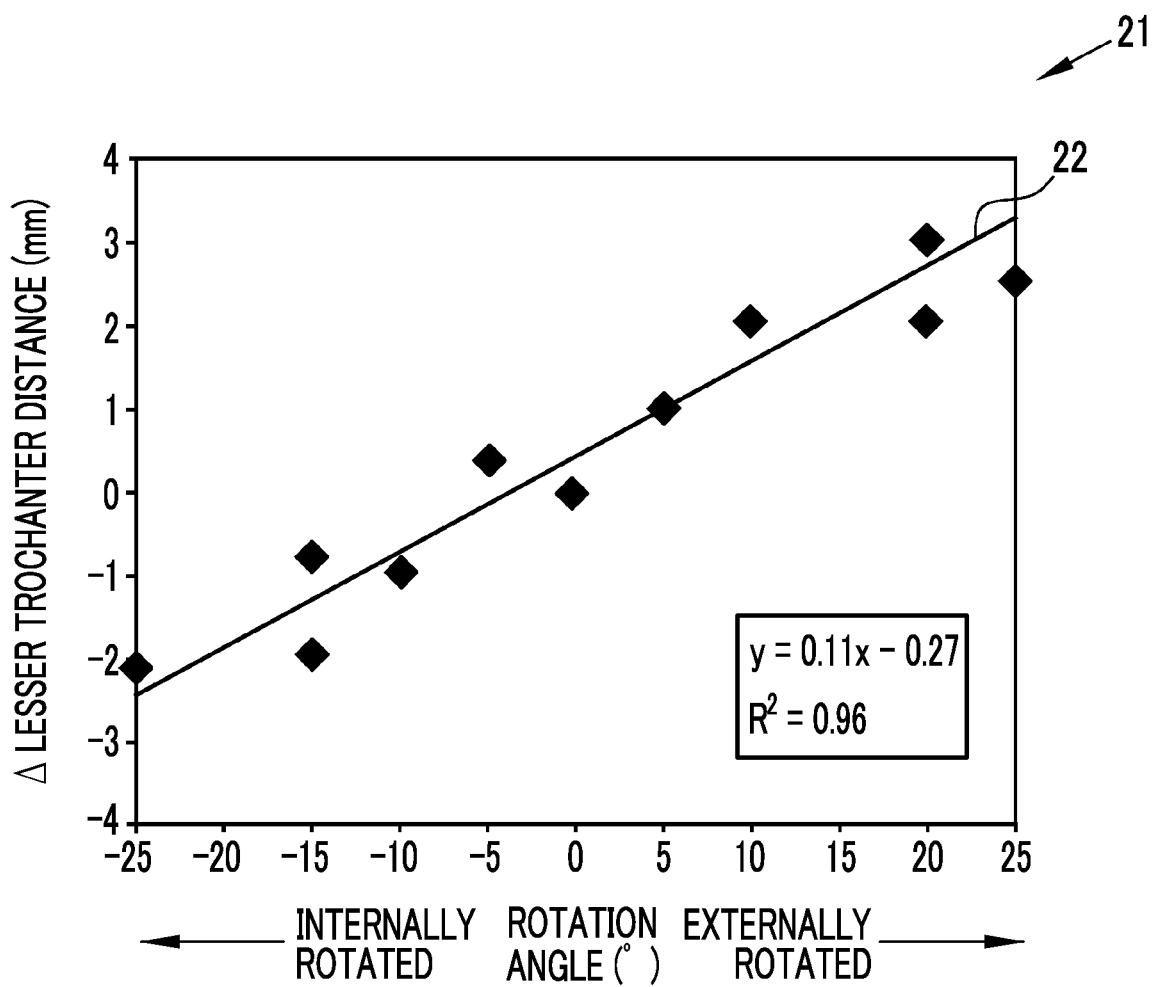
FIG. 5 is a graph showing a relationship between the lesser trochanter distance and the rotation angle in the X-ray image.

As shown in FIG. 5, the rotation angle correspondence information can be a relational expression 22 that is a regression curve obtained by performing regression analysis on the actually measured lesser trochanter distance a and the rotation angle. A graph 21 is obtained by plotting data on a plurality of actually measured lesser trochanter distances a and rotation angles with the vertical axis representing the lesser trochanter distance a and the horizontal axis representing the rotation angle. In the actual measurement, specifically, as for the same thighbone 15, the lesser trochanter distance a is measured for each of a plurality of X-ray images 14 acquired under the same conditions except that the rotation angle is changed to a plurality of predetermined values. In addition, the vertical axis and the horizontal axis represent differences from the reference position. That is, the vertical axis represents a difference Δ (unit: mm) from the actually measured lesser trochanter distance a with the lesser trochanter distance a in a case where the rotation angle is 0° as a reference (0 mm), and the horizontal axis represents a rotation angle (unit: °) from the reference position with the reference position as the rotation angle of 0°. A regression curve is obtained by performing the regression analysis on these data, and this regression curve is used as the relational expression 22. In addition, the relational expression 22 is expressed in the following Expression (1), for example, in a case where the difference Δ of the lesser trochanter distance a is y (mm) and the rotation angle is x (°).

$$y = 0.11x - 0.27 \quad (1)$$

Additionally, the relational expression 22 shows that a determination coefficient $R^2$ is 0.96 and the relationship between the lesser trochanter distance a and the rotation angle is accurate. In addition, it can be seen from the relational expression 22 that the difference Δ of the lesser trochanter distance a that is about 1 mm occurs with respect to an internal rotation angle of 10° in both the internal rotation and the external rotation.

The bone quantity acquisition unit 13 converts the pixel value into the bone quantity information for each pixel of the radiation image acquired by the analysis image acquisition unit 11 to obtain pre-correction bone quantity information. Then, the bone quantity information is acquired by correcting the pre-correction bone quantity information on the basis of the rotation angle acquired by the rotation angle acquisition unit 12. The bone quantity calculated using the acquired bone quantity information is used as the bone quantity measured using an analysis device 10. In the correction, the pre-correction bone quantity information is converted so that the rotation angle becomes the bone quantity information equivalent to 0°.

The bone quantity information is information representing the bone quantity and is data corresponding to the bone quantity that is a measurement result. Therefore, by using the bone quantity information, it is possible to calculate the bone quantity that is the measurement result. In addition, since the bone quantity that is the measurement result has the same meaning as the BMD (unit: $g/cm^2$), the bone quantity can be said to be an absolute value of the bone quantity. The bone quantity information may be any data as long as the bone quantity information can be used to calculate the bone quantity that is the measurement result, and may be a relative value representing the bone quantity, or another value, or may be an absolute value representing the bone quantity. In the present embodiment, the bone quantity information is information representing the absolute value of the bone quantity measured.

As a method of converting the pixel value into the bone quantity information, a method of referring to an LUT in which the pixel value and the bone quantity information correspond to each other in order to perform correction depending on imaging conditions such as a tube voltage, thereby acquiring, for each pixel, a transformation coefficient for converting the pixel value of a bone region of a bone part captured in the X-ray image 14 into bone quantity information, and then, multiplying the pixel value by a transformation coefficient to obtain the pre-correction bone quantity information is mentioned.

Next, as a method of correcting the pre-correction bone quantity information on the basis of the rotation angle, the present inventors have found that the bone quantity at the reference position can be accurately acquired by using the correction coefficient correspondence information in which the rotation angle corresponds to the correction coefficient for correcting the pre-correction bone quantity information. The correction coefficient correspondence information may be a relational expression obtained by performing a polynomial approximation or the like from the actually measured pre-correction bone quantity information and the rotation angle, or may be an LUT or the like. In a case where the relational expression between the rotation angle and the bone quantity information acquired in advance is used, it is preferable that the relational expression is a relational expression obtained by performing the polynomial approximation on the relationship between the rotation angle and the bone quantity information obtained by the actual measurement. According to this relational expression, it was possible to suppress the individual differences and correct the pre-correction bone quantity information to the bone quantity information equivalent to a rotation angle of 0°. The bone quantity 17 based on the bone quantity information obtained in this way was substantially the same as the bone quantity measured in a case where imaging is performed at a rotation angle of 0°.

Figure 6:
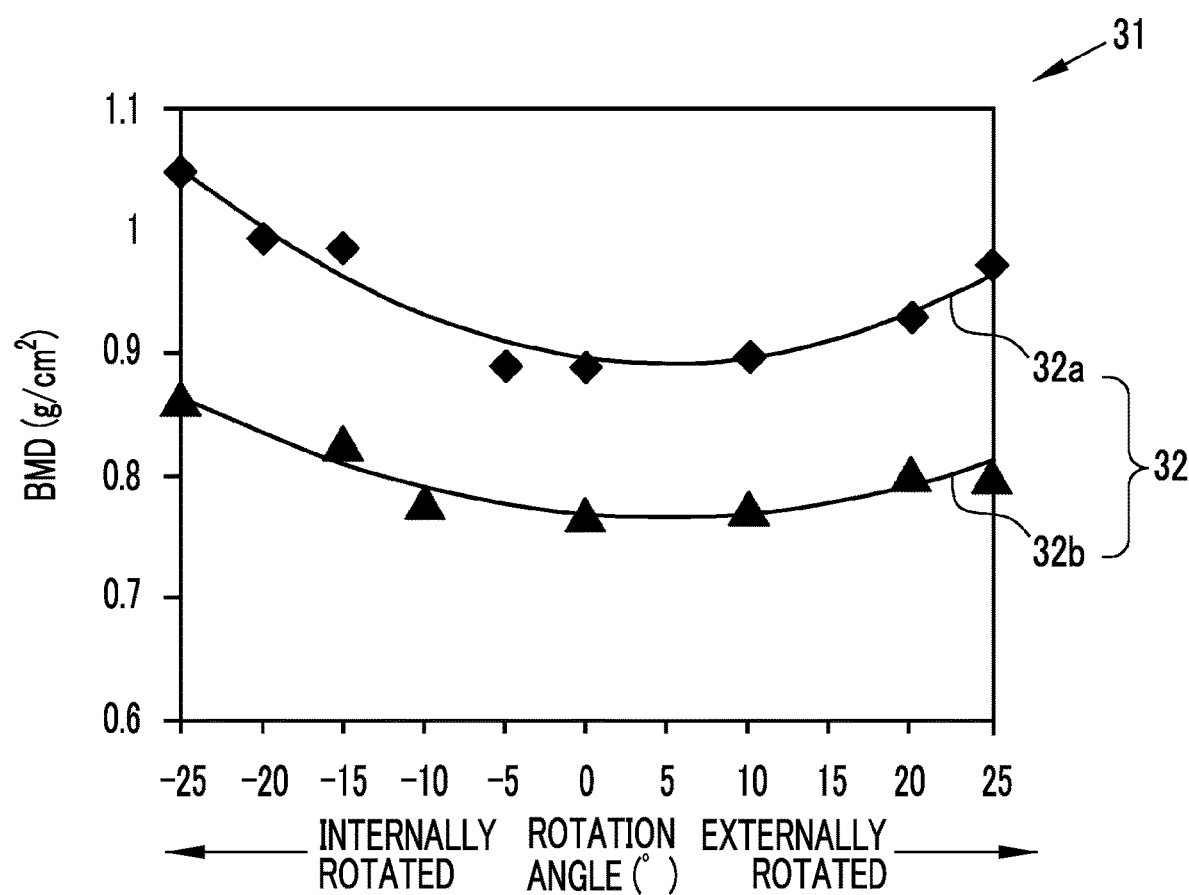
FIG. 6 is a graph showing a relationship between a bone quantity (BMD) and the rotation angle.

As shown in FIG. 6, the correction coefficient correspondence information can be a relational expression 32 obtained by the polynomial approximation by performing the regression analysis on the actually measured BMD (unit: $g/cm^2$) and rotation angle. A graph 31 is obtained by plotting data on a plurality of actually measured BMDs and rotation angles with the vertical axis representing BMD and the horizontal axis representing the rotation angle. In the actual measurement, specifically, as for the same thighbone 15, the bone quantity converted on the basis of a pixel value for each pixel is obtained for each of a plurality of X-ray images 14 acquired under the same conditions except that the rotation angle is changed to a plurality of predetermined values. An expression 32a is a value of a human bone a, a relational expression 32b is a value of a human bone b, and the human bone a and the human bone b are different human bones. In addition, in the relational expressions, a case where the relational expression 32a and the relational expression 32b are not distinguished is referred to as the relational expression 32. Additionally, the vertical axis represents an actually measured value, the horizontal axis represents a difference from the reference position, minus is a rotation angle caused by the internal rotation, and plus is a rotation angle caused by the external rotation. That is, the horizontal axis represents the rotation angle (unit: °) from the reference position with the reference position as a rotation angle of 0°. A regression curve is obtained by performing the regression analysis on these data, and this regression curve is used as the relational expression 32. The relational expression 32 is a polynomial expression, and even different people can make approximations with the same polynomial expression.

As described above, according to the analysis device 10 of the embodiment of the present invention, it is possible to calculate the bone quantity equivalent to a case where imaging is performed with constant positioning after the influence of the rotation of the thighbone 15 is considered using the X-ray image 14 captured without strictly adjusting the positioning. For example, in a case where the bone part is the thighbone 15, even in a case where the rotation angle of the thighbone 15 captured in the X-ray image 14 varies, it is possible to obtain the bone quantity obtained in a case where imaging is performed at a reference position where the rotation angle of the thighbone 15 is 0°. Therefore, according to the analysis device 10 of the embodiment of the present invention, it is possible to easily measure the bone quantity at a certain reference by using the X-ray image 14.

Figure 7:
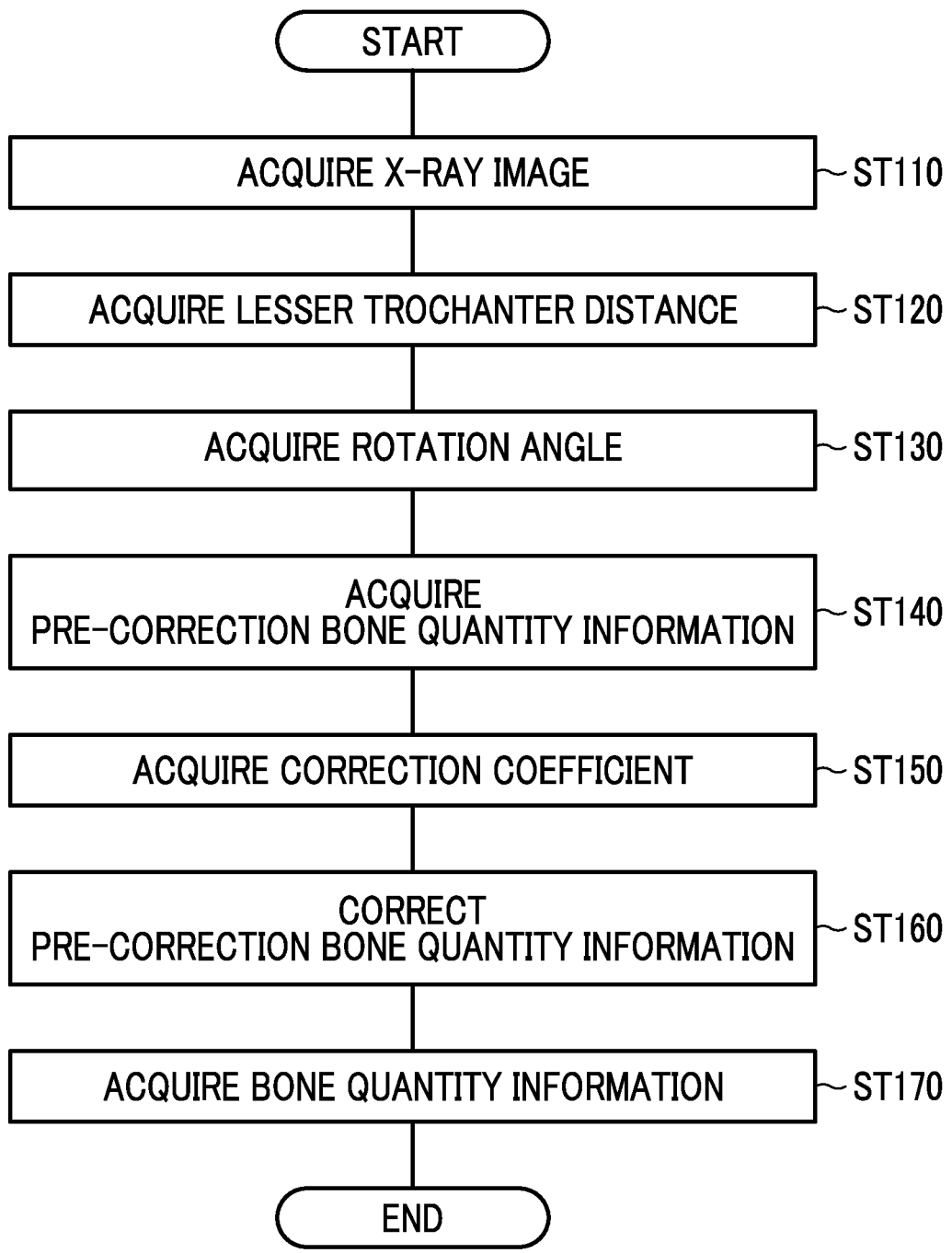
FIG. 7 is a flowchart illustrating a flow of the processing of the radiation image analysis device.

An example of processing of the analysis device 10 of the embodiment of the present invention will be described with reference to a flowchart shown in FIG. 7. The analysis device 10 acquires an X-ray image 14 obtained by performing simple X-ray radiography of a subject including a proximal thighbone part of the thighbone 15 (Step ST110). Next, in order to acquire a rotation angle, the lesser trochanter distance a of the lesser trochanter 16 that is a portion of the bone part is acquired on the basis of the X-ray image 14 (Step ST120). Next, the rotation angle of the thighbone 15 from a reference position is acquired on the basis of the X-ray image 14 (Step ST130). In the present embodiment, the rotation angle is acquired by using the rotation angle correspondence information in which the lesser trochanter distance a and the rotation angle correspond to each other.

Next, pre-correction bone quantity information of the thighbone 15 obtained by converting a pixel value for each pixel of the X-ray image 14 is acquired (Step ST140). In the present embodiment, the conversion of the pixel value is performed using an LUT acquired in advance. Next, a correction coefficient for correcting the pre-correction bone quantity information is acquired on the basis of the rotation angle (Step ST150). In the present embodiment, the correction coefficient is performed using correction coefficient correspondence information in which the rotation angle corresponds to the correction coefficient for correcting the pre-correction bone quantity information.

Then, the pre-correction bone quantity information is corrected by multiplying the pre-correction bone quantity information by the correction coefficient (Step ST160). A corrected value of the pre-correction bone quantity information becomes finally acquired bone quantity information obtained by measuring the bone quantity at the reference position on the basis of the radiation image (Step ST170).

In bone quantity measurement based on a DXA examination used for diagnosing osteoporosis, or the like, the lumbar spine and the thighbone, which have many vulnerable fractures, are measured. Since the measured bone quantity is an amount projected on two dimensions (unit: $g/cm^2$), there is a problem that a measurement value fluctuates due to a change in the posture of a patient. The bone quantity in an outer cortical bone is larger than that in an inner spongy bone, and the fluctuation in the measurement value increases due to a change in the amount of overlapping of the cortical bones projected two-dimensionally by the rotation of the bone. For this reason, in particular, the measurement of the thighbone, which tends to move in a rotation direction, is greatly affected. A radiologist positions the patient at a position where the bone is directly in front of incident X-rays by using a fixture or checking a pre-shot image so that accurate measurement with excellent reproducibility can be performed.

However, there is a case where it takes a long time to adjust the positioning or it is not possible to obtain preferable positioning depending on patients. Additionally, in the diagnosis of osteoporosis, or the like, in a case where it is desired to obtain a change from the past bone quantity of the same patient, radiation images captured with the same positioning are preferred. Therefore, there is a case where a radiation image for which the positioning is not appropriate results in imaging failure, and re-imaging may be required. Additionally, since dedicated equipment is required for the DXA examination having high measurement accuracy, there is a case where it is difficult to perform the examination easily.

In the analysis device 10 of the embodiment of the present invention, it is possible to accurately obtain the bone quantity in a case where an image is captured with a rotation angle equivalent to 0 degrees by a radiation image captured without strictly matching the positioning. Therefore, the positioning adjustment load can be reduced. Additionally, it is possible to prevent an increase in exposure dose caused by re-imaging due to poor positioning.

Additionally, since a radiation image obtained by the simple imaging can be used, the existing facility can be used without the need for dedicated equipment for performing imaging such as the DXA method. Additionally, it is possible to use the past data of a radiation image that is captured by using the existing facility and is not appropriate for the positioning adjustment. Additionally, since a fixture dedicated to the bone quantity measurement and internally rotated positioning for the bone quantity measurement are not required, the analysis device 10 can also be used for radiography such as X-ray radiography for other purposes and can contribute to the efficiency of examination.

The analysis device 10 can also be preferably applied even in a case where there is dedicated equipment for performing imaging such as the DXA method. Since it is possible to calculate a measurement value obtained by correcting the influence of the rotation of a bone part on a radiation image obtained by the DXA method, it is possible to obtain a measurement value of the bone quantity at a certain reference, that is, at a certain rotation angle.

Next, an example of an embodiment of a radiography system or the like including the analysis device 10 of the embodiment of the present invention will be described. The radiography system acquires an X-ray image 14 of a subject Obj by imaging the subject Obj using X-rays, and acquires bone quantity on the basis of the X-ray image 14.

Figure 8:
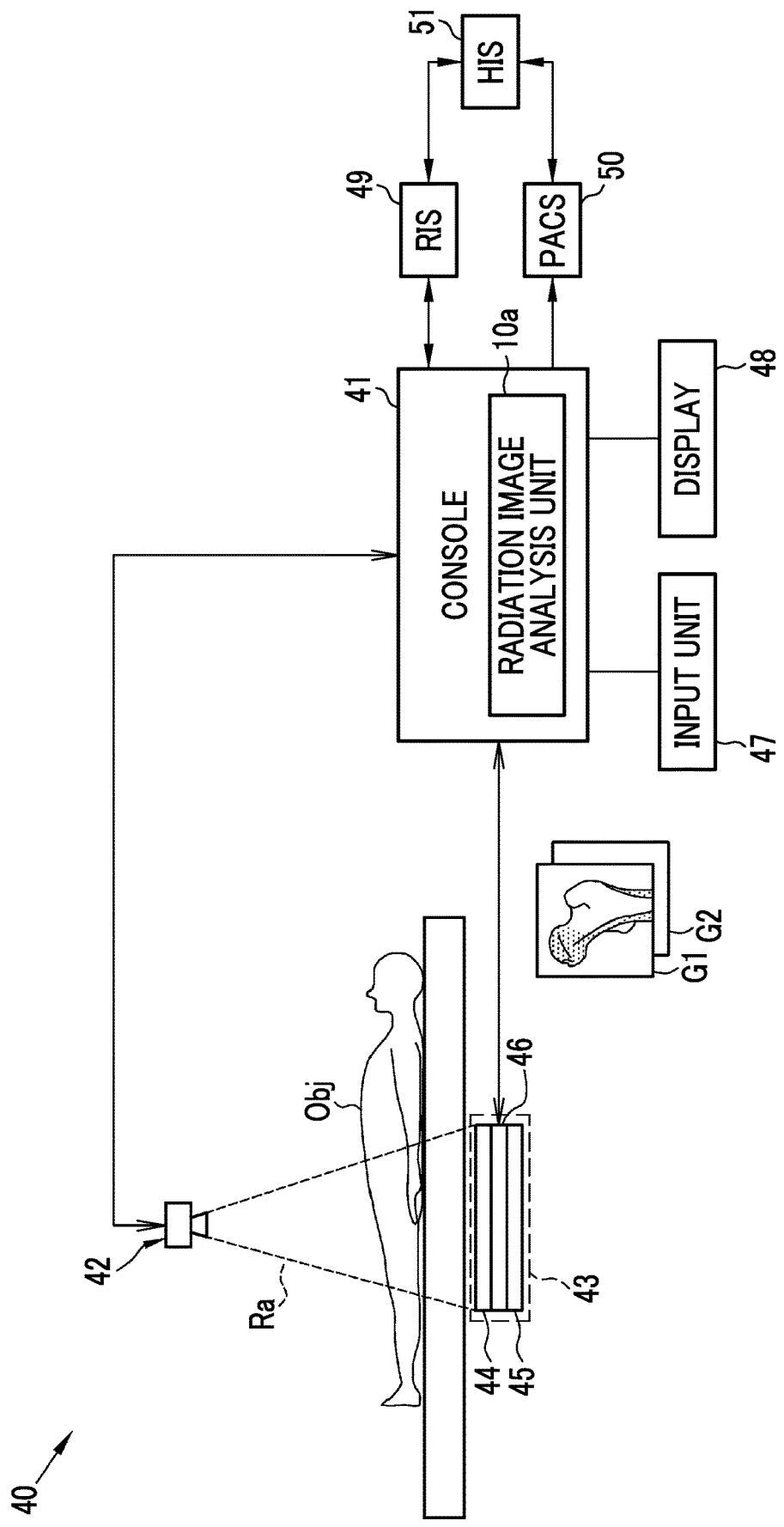
FIG. 8 is a schematic diagram of a radiography system.

As shown in FIG. 8, the radiography system 40 comprises a radiation source 42 that is a radiation generation unit, a radiography unit 43, and a console 41. The radiography unit 43 detects radiation to generate radiation image data.

The console 41 is a main control device of the radiography system 40, includes an analysis device (radiation analysis device) 10, and is connected to an input unit 47, a display 48, an image server such as a picture archiving and communication system for medical application (PACS) 50 that manages a captured X-ray image 14 and information on the X-ray image 14, and an information management server such as a hospital information system (HIS) 51 and a radiology information system (RIS) 49 that register and manage information such as patient information, medical information, examination information, accounting information, and imaging order for each patient.

The radiography system 40 captures two X-ray images 14 consisting of a first radiation image G1 and a second radiation image G2 with radiation having mutually different energy distributions. As a method of capturing two X-ray images 14 having different energy distributions, a method of performing imaging by alternately irradiating the radiography unit 43 consisting of one detector with X-rays having mutually different energy distributions that have passed through the subject Obj, and a so-called one-shot energy subtraction method that is a method of performing imaging by irradiating the radiography unit 43 consisting of two superimposed detectors with X-rays transmitted through the subject Obj can be adopted. In the one-shot energy subtraction method, radiation images of two different energy components can be recorded in single irradiation (one shot) to the subject. In the present embodiment, the one-shot energy subtraction method is adopted. Any one or two of the two captured radiation images is used as the X-ray image 14 for acquiring the bone quantity.

The radiation source 42 generates radiation used for the radiography. In the present embodiment, the radiation source 42 is an X-ray source that generates X-rays Ra. The subject Obj is a person and includes a proximal thighbone part of the thighbone 15 of the person.

The radiography unit 43 comprises a first radiation detector 44 and a second radiation detector 45. Each of the first radiation detector 44 and the second radiation detector 45 is, for example, a flat panel detector (FPD). The FPD detects the X-rays Ra transmitted through the subject Obj and converts the detected X-rays Ra into electric signals to output an X-ray image 14 of the subject Obj.

In a case where the first radiation detector 44 and the second radiation detector 45 receive the X-rays emitted from the radiation source 42 and passed through the subject Obj, each of the first radiation detector 44 and the second radiation detector 45 receives the energy of the X-rays by changing the energy. During imaging, the radiation source 42 is driven by disposing the first radiation detector 44, an X-ray energy conversion filter 46 made of a copper plate or the like, and the second radiation detector 45 in order from a side closer to the radiation source 42. In addition, it is preferable that the first radiation detector 44 and the second radiation detector 45, and the X-ray energy conversion filter 46 are closely attached each other as much as possible.

Accordingly, in the first radiation detector 44, the first radiation image G1 of the subject Obj obtained by low-energy X-rays including so-called soft rays can be obtained. Additionally, in the second radiation detector 45, the second radiation image G2 of the subject Obj obtained by high-energy X-rays from which the soft rays have been removed can be obtained. The console 41 receives the first radiation image G1 and the second radiation image G2.

As the first radiation detector 44 and the second radiation detector 45, so-called direct radiation detectors may be used that can repeatedly record and read a radiation image and directly undergo irradiation with radiation to generate electric charges. Alternatively, as the first radiation detector 44 and the second radiation detector 45, indirect radiation detectors may be used that first convert radiation into visible light and then convert the visible light into charge signals. As a method of reading radiation image signals, it is preferable to use a so-called optical reading method in which the radiation image signals are read out by turning thin film transistor (TFT) switches on and off.

The console 41 is a main control device (so-called computer) of the radiography system 40, and is, for example, a personal computer or a computer such as a workstation in which an application program for executing predetermined functions is installed. The analysis device 10 is also, for example, a personal computer or a computer such as a workstation in which an application program for executing predetermined functions is installed. The computer is provided with a central processing unit (CPU) that is a processor, a memory, a storage, and the like, and various functions are realized by a program or the like stored in the storage.

In the present embodiment, the computer of the console 41 executes the functions of the main control device of the radiography system 40 and the functions of the analysis device 10. In a case where the computer of the console 41 executes the functions of the analysis device 10, a radiation image analysis unit (hereinafter, referred to as an analysis unit) 10a included in the console 41 executes the functions of the analysis device 10. Therefore, the console 41 includes the analysis unit 10a. In addition, the analysis device 10 may be a computer common to the computer of the console 41 as in the present embodiment or may be a computer other than the console 41. That is, the analysis device 10 may be included in another device or the like connected to the console 41 or may be a single device.

Specifically, the functions of the analysis unit 10a are realized by operating the computer of the console 41 with a radiation image analysis program. For example, the computer of the console 41 stores the radiation image analysis program in the storage or the like (not shown) and executes the radiation image analysis program. The radiation image analysis program causes the computer to execute a function of acquiring a radiation image obtained by simply imaging a subject including a bone part, a function of acquiring a rotation angle from a reference position of the bone part on the basis of the radiation image, and a function of calculating the bone quantity of the bone part by correcting pre-correction bone quantity information of the bone part obtained by converting a pixel value of the radiation image for each pixel on the basis of the rotation angle.

The input unit 47 connected to the console 41 is a user interface that receives an operation related to processing of an imaging menu, radiography, analysis performed by the analysis unit 10a, and the like, and receives input from the user. The user interface may be a keyboard, a mouse, a touch panel, or the like (none of which are shown). The touch panel may be the display 48 connected to the console 41, and may receive various operations in cooperation with a graphical user interface (GUI) displayed on the display 48.

The display 48 connected to the console 41 displays an imaging menu sent from the RIS 49, a GUI screen for instructing or controlling imaging, the captured X-ray image 14 and the measured bone quantity, the GUI that operates or controls the analysis unit 10a and the like, and the like. In addition, in a case where the display 48 is connected to various information management servers such as the RIS 49, the display 48 can communicate with the various information management servers such as the RIS 49 to display the patient information, the past X-ray image 14, and the like. Additionally, the console 41 transmits the captured X-ray image 14, the analysis result of the analysis unit 10a, and the like to an image server such as the PACS 50 or various information management servers such as the RIS 49. Moreover, the console 41 may not only receive the X-ray image 14 captured from the radiography unit 43, but may also receive the X-ray image 14, which is included in a server such as the RIS 49 and captured in the past. In this case, the analysis unit 10a can acquire the bone quantity based on the past X-ray image 14 to display the acquired bone quantity on the display 48 or the like by analyzing the X-ray image 14 captured in the past.

Figure 9:
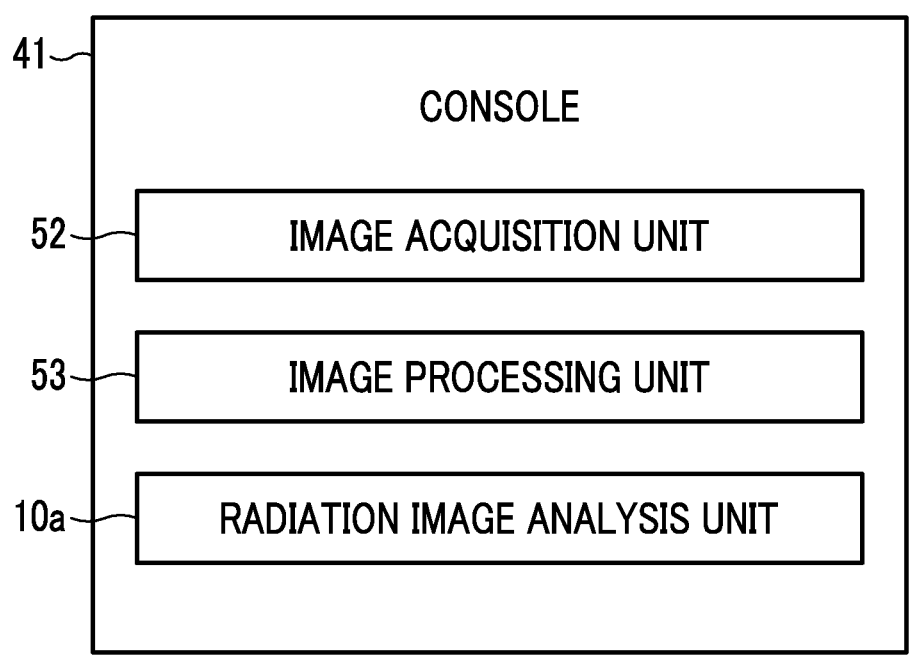
FIG. 9 is a block diagram showing the functions of a console.

As shown in FIG. 9, the console 41 comprises an image acquisition unit 52, an image processing unit 53, and an analysis unit 10a that functions as the analysis device 10. The image acquisition unit 52 acquires a radiation image detected by the radiation detector of the radiography unit 43 by imaging. The image processing unit 53 performs image processing on the radiation image acquired by the image acquisition unit 52.

In the present embodiment, the image processing unit 53 acquires the captured first radiation images G1 and second radiation image G2, processes the captured first radiation images G1 and second radiation image G2 with an appropriate coefficient, and then extracts the bone part or the soft part depending on the difference to generate a bone tissue image or a soft tissue image. Additionally, the bone tissue image and the soft tissue image may be combined to separate each of the images to generate a composite image that is easy to see. Therefore, the X-ray image 14 after the image processing performed by the image processing unit 53 includes at least any one of the bone tissue image, the soft tissue image, or the composite image. In the present embodiment, the bone tissue image generated by the image processing unit 53 is used as the X-ray image 14 after image processing to be input to the analysis unit 10a.

Figure 10:
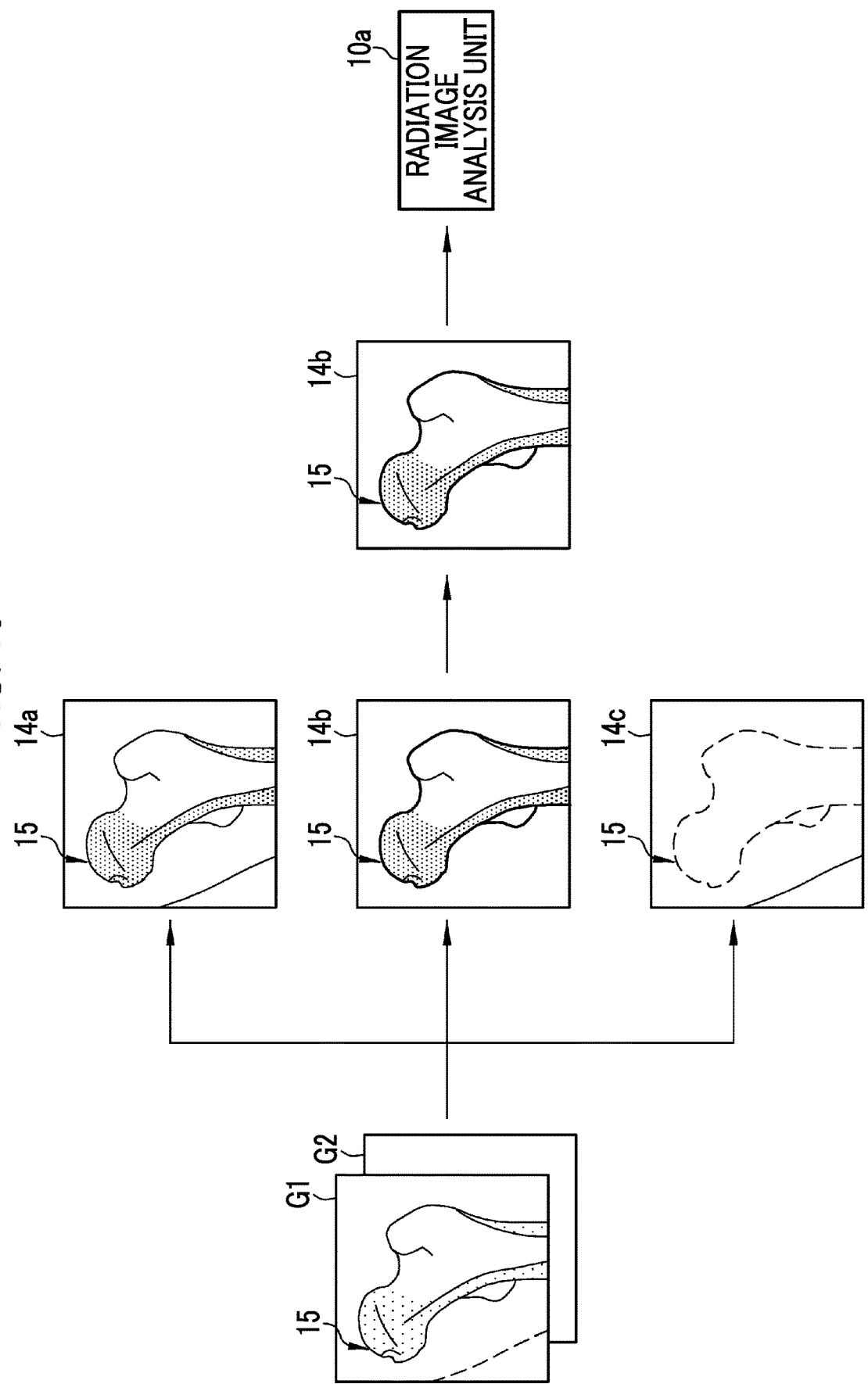
FIG. 10 is an explanatory diagram illustrating the generation of a bone tissue image.

As shown in FIG. 10, the image processing unit 53 performs image processing on the acquired first radiation image G1 and second radiation image G2 by using the energy subtraction method. The first radiation image G1 and the second radiation image G2 are simple X-ray images. A bone tissue image 14b is generated by the image processing of extracting the bone part by using a characteristic difference between two X-ray energies in a case where the first radiation image G1 and the second radiation image G2 are acquired. Additionally, similarly, the soft tissue image 14c is generated by the image processing of extracting the soft part. The generated bone tissue image 14b is input to the analysis image acquisition unit 11 (refer to FIG. 1) of the analysis unit 10a. In addition, by combining the bone tissue image 14b and the soft tissue image 14c with each other, the soft part and the bone part may be separated to generate a composite image 14a that is easy to see.

In some cases, the composite image 14a may be input to the analysis image acquisition unit 11 in addition to the bone tissue image 14b. Therefore, the X-ray image 14 acquired by the analysis image acquisition unit 11 includes the bone tissue image 14b and the composite image 14a in addition to the X-ray image 14 that is not subjected to the image processing for analysis.

In addition, in a case where a scattered ray removal grid that removes a scattered ray component of the X-rays transmitted through the subject Obj is used during the imaging of the subject Obj, the first radiation image G1 and the second radiation image G2 includes a primary ray component of the X-rays transmitted through the subject Obj. On the other hand, in a case where the scattered ray removal grid is not used during the imaging of the subject Obj, the first radiation image G1 and the second radiation image G2 include a primary ray component and a scattered ray component of the X-rays.

Additionally, in a case where the scattered ray component is included in the X-ray image 14, it is preferable to estimate and remove the scattered rays generated for each thickness from the thickness distribution of the body thickness of the subject Obj. It is preferable that the X-ray image 14 that is a target from which the scattered rays are estimated and removed is the first radiation image G1 or the second radiation image G2 that is obtained by imaging and is not subjected to image processing such as bone part extraction. This is because more preferable image processing results can be obtained by performing various image processing such as the bone part extraction after the scattered rays are removed.

Figure 11:
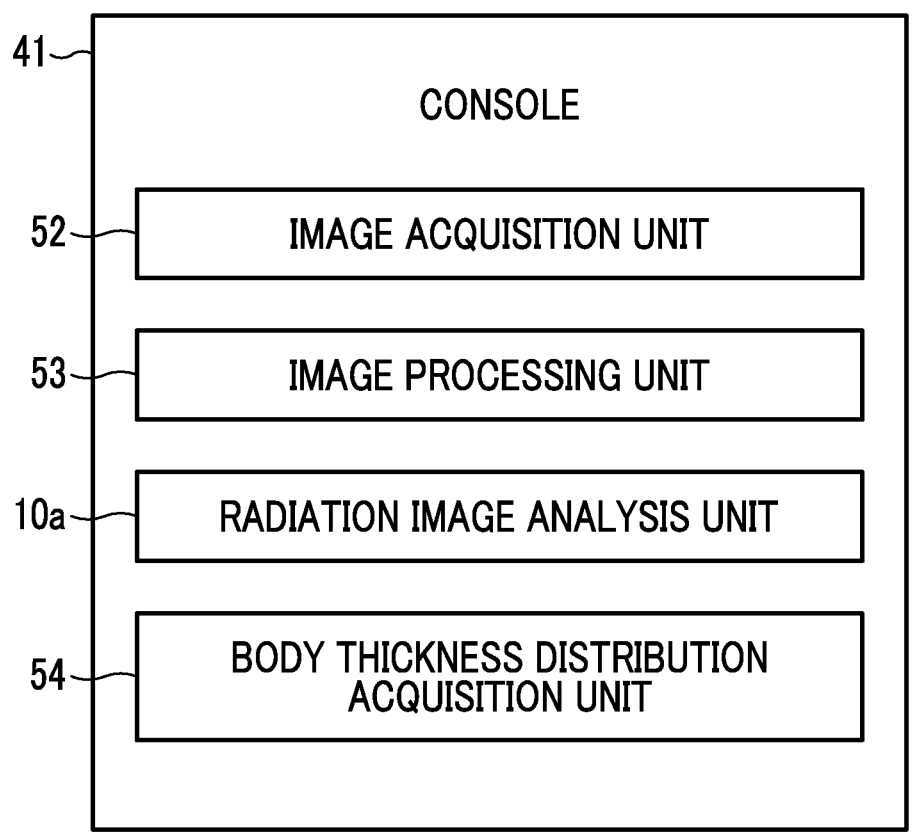
FIG. 11 is a block diagram showing the functions of the console comprising a body thickness distribution acquisition unit.

As shown in FIG. 11, in this case, the console 41 includes a body thickness distribution acquisition unit 54. The thickness distribution of the subject Obj may be a measurement value or an estimation value. Therefore, the body thickness distribution acquisition unit 54 acquires the measurement value of the thickness distribution of the subject Obj or acquires the estimation value of the thickness distribution of the subject Obj. The body thickness distribution acquisition unit 54 estimates the scattered rays for each pixel on the basis of the body thickness distribution that is the acquired measurement value or estimation value, and removes the scattered rays from the first radiation image G1 and the second radiation image G2, respectively. The first radiation image G1 and the second radiation image G2 from which the scattered rays have been removed are input to the image processing unit 53 in order to perform the image processing such as the bone part extraction, as the first radiation image G1 and the second radiation image G2 that have undergone the image processing.

In addition, the X-ray image 14 that is a target from which the scattered rays are to be removed is not limited to either the first radiation image G1 or the second radiation image G2, and may be any target, such as the bone tissue image 14b, the soft tissue image 14c, or the composite image 14a. In addition, since the first radiation image G1 and the second radiation image G2 are X-ray images 14 obtained by the one-shot energy subtraction method, the body thickness distribution of Obj of the subject can be estimated on the basis of either the first radiation image G1 or the second radiation image G2, and the obtained estimation value can be used as it is as the body thickness distribution of the second radiation image G2.

The bone tissue image 14b, the soft tissue image 14c, or the like is generated by removing the scattered rays from the first radiation image G1 or the second radiation image G2 that is not subjected to image processing, and then, performing image processing such as the bone part extraction or soft part extraction. Therefore, since the image processing such as the bone part extraction is performed while suppressing the influence of the scattered rays, a more accurate bone tissue image 14b or soft tissue image 14c can be generated.

Figure 12:
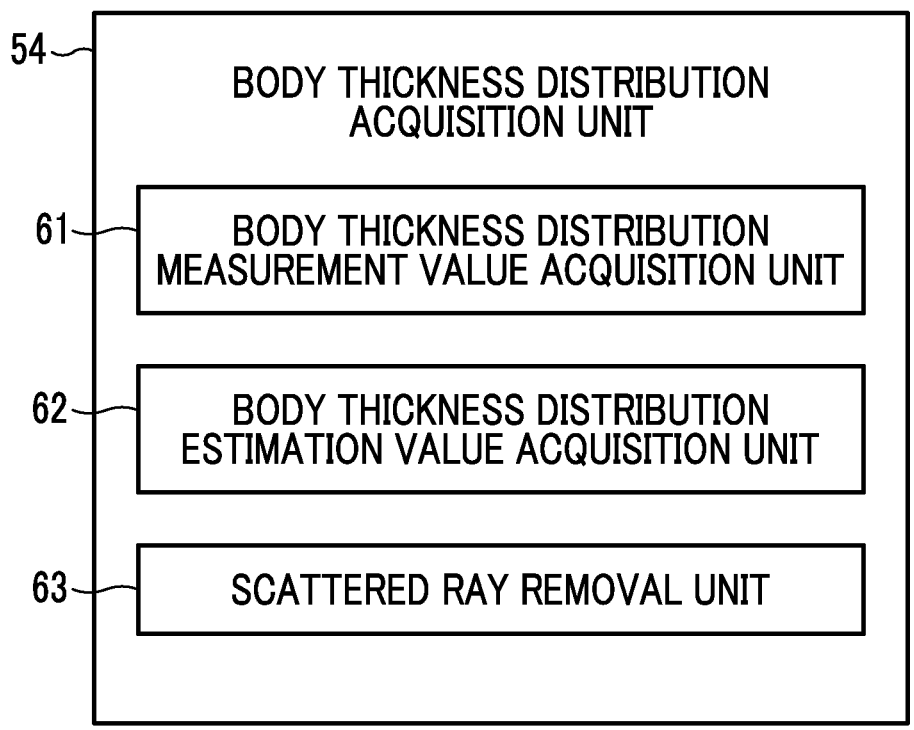
FIG. 12 is a block diagram showing a function of the body thickness distribution acquisition unit.

As shown in FIG. 12, the body thickness distribution acquisition unit 54 includes a body thickness distribution measurement value acquisition unit 61, a body thickness distribution estimation value acquisition unit 62, and a scattered ray removal unit 63. The body thickness distribution acquisition unit 54 acquires a measured body thickness distribution. The body thickness distribution measurement value acquisition unit 61 acquires a measurement value obtained by actually measuring the body thickness distribution, and sets the acquired measurement value as the body thickness distribution of the subject Obj.

The body thickness distribution estimation value acquisition unit 62 acquires an estimation value of the thickness distribution of the subject by using a known method. As a method of acquiring the estimation value of the thickness distribution or performing the image processing of removing the scattered rays by using the acquired estimation value of the thickness distribution, it is preferable to adopt, for example, a method using a virtual model described in JP2015-043959A.

In the method using a virtual model, first, a virtual model having a predetermined body thickness distribution is acquired, and an estimated primary ray image and an estimated scattered ray image obtained by radiography of the virtual model are combined with each other to generate an estimated image. Next, the body thickness distribution of the virtual model is corrected from the subject image obtained by the radiography of the subject Obj and the estimated image so that an error value representing a difference between the pixel values of pixels at individual corresponding positions is small. The body thickness distribution of the corrected virtual model is determined as the body thickness distribution of the subject. In this way, for example, even in a subject imaged without using a grid, the influence of the scattered rays can be suppressed, and a more accurate estimation value of the body thickness distribution can be obtained.

The scattered ray removal unit 63 acquires the obtained measurement value or estimation value of the body thickness distribution of the subject as the body thickness distribution of the subject Obj, and removes the scattered rays from the X-ray image 14 on the basis of the acquired body thickness distribution. As a method of removing the scattered rays, a known method can be adopted. For example, by subtracting the estimated scattered ray image estimated from the body thickness distribution from the X-ray image 14 obtained by the imaging, the X-ray image 14 from which the scattered ray component has been removed may be generated.

The X-ray image 14 obtained as described above is sent to the analysis image acquisition unit 11 of the analysis unit 10a. In the present embodiment, the X-ray image 14 acquired by the analysis image acquisition unit 11 is the bone tissue image 14b obtained by performing the image processing on the first radiation image G1 and the second radiation image G2 that have been subjected to the image processing for removing scattered rays. The analysis image acquisition unit 11 sends the acquired bone tissue image 14b to the rotation angle acquisition unit 12, and the rotation angle acquisition unit 12 acquires a rotation angle from the reference position of the bone part on the basis of the bone tissue image 14b.

In addition, the rotation angle acquisition unit 12 may adopt a method of using a machine learning technique to obtain the rotation angle from the trained model in which the learning model is trained by the radiation image in which the correct answer data of the rotation angle is given, in addition to obtaining the rotation angle from a change in the shape of the lesser trochanter 16 that is a part of the thighbone 15 in the bone tissue image 14b.

Figure 13:
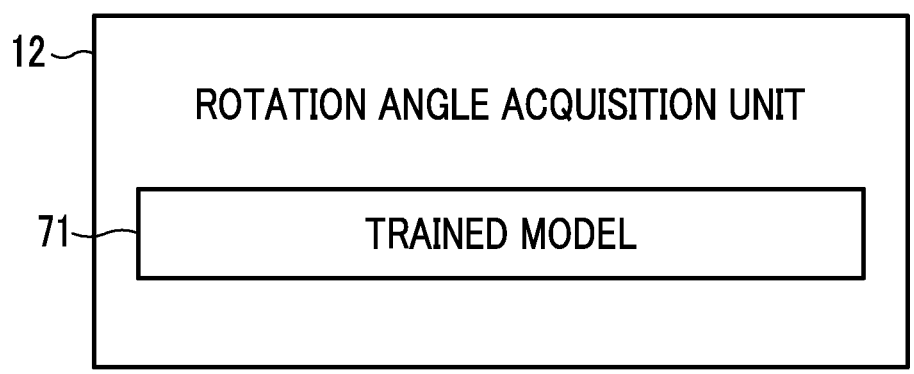
FIG. 13 is a block diagram showing a function of a rotation angle acquisition unit comprising a trained model.

As shown in FIG. 13, in this case, the rotation angle acquisition unit 12 (refer to FIG. 1) includes a trained model 71. The trained model 71 is a so-called mathematical formula in which parameters are determined in a learning model consisting of a preset algorithm, and adjusts the parameters by inputting input information including the bone tissue image 14b that is the X-ray image 14, thereby estimating an estimation result related to a rotation angle so that the estimation result can be output. Therefore, the trained model 71 has parameters for outputting the estimation result related to the rotation angle on the basis of the input information including the bone tissue image 14b.

As the learning model to be set in advance, a learning model capable of outputting a preferable result with respect to the input information consisting of an image is preferable. Therefore, for the learning model, it is preferable to use a neural network having a multilayer structure, which is suitable for image recognition, particularly a convolutional neural network (CNN), and it is preferable to adopt deep learning. The bone tissue image 14b to which the correct answer data of the rotation angle is given is input to the learning models, and learning is performed in which the parameters are adjusted so as to output the correct answer of the rotation angle. The parameters are adjusted by repeating the learning many times, and the trained model 71 is set such that the rotation angle estimated and output in a case where the bone tissue image 14b is input is substantially the rotation angle of the correct answer. In a case where the trained model 71 is generated, it is preferable to generate and use the trained model 71 for each type of the X-ray image 14 to be input. The type of the X-ray image 14 to be input can be distinguished depending on the type of the bone part captured in the X-ray image 14, the type of the image processing performed on the X-ray image 14, or the like.

Additionally, in learning on the learning model, or in a case where an estimation result related to a rotation angle is output using the trained model 71, it is possible to appropriately adopt a technique performed by machine learning in order to obtain a preferable estimation result, such as use of a plurality of learning models, contrivance of processing for the bone tissue image 14b to be trained, or suppression of over-learning.

Figure 14:
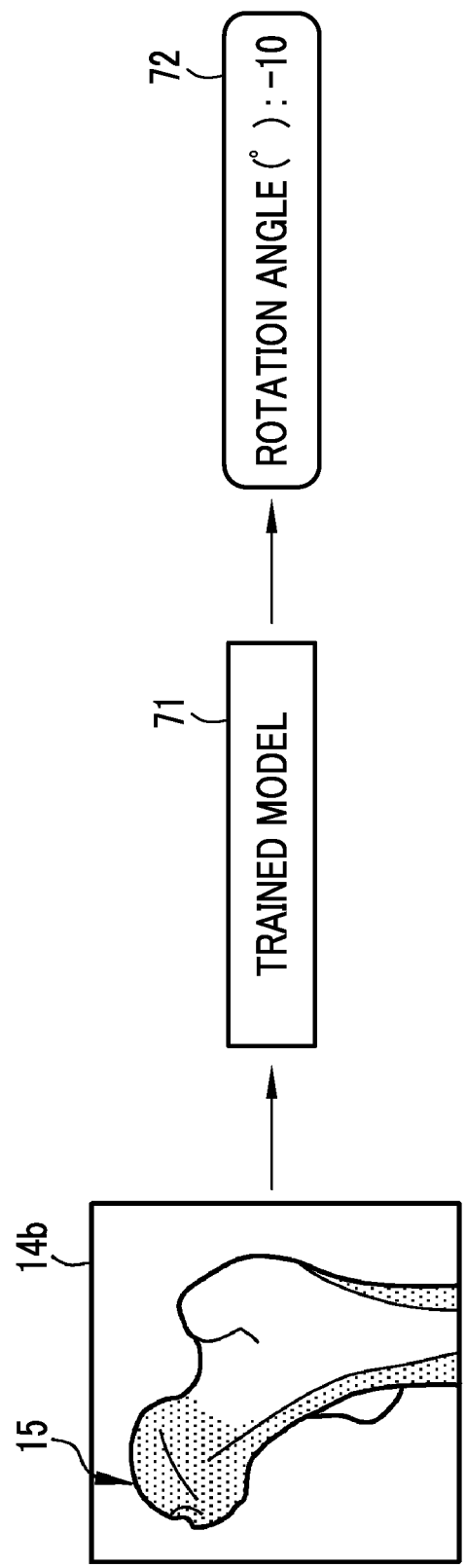
FIG. 14 is an explanatory diagram illustrating the functions of the trained model.

As shown in FIG. 14, the trained model 71 is trained through the bone tissue image 14b in which the thighbone 15 is captured and the correct answer data of the rotation angle, using the CNN, and adjusts the parameters. By inputting the bone tissue image 14b in which the thighbone 15 of which the rotation angle is unknown is captured to the trained model 71, the estimation result 72 is output as, for example, the rotation angle of minus 10°. That is, it is estimated that the rotation angle of the thighbone 15 in which the rotation angle captured in the bone tissue image 14b input to the trained model 71 is unknown is minus 10°.

The rotation angle acquisition unit 12 acquires the estimation result output by using the trained model 71 as the rotation angle. Using the acquired rotation angle in order to correct the pre-correction bone quantity information by using the correction coefficient correspondence information is the same as in a case where the rotation angle is acquired from the shape of the lesser trochanter 16.

Next, the bone quantity acquisition unit 13 obtains the pre-correction bone quantity information by converting a pixel value for each pixel of the bone tissue image 14b. The bone quantity acquisition unit 13 (refer to FIG. 1) acquires bone quantity information for each pixel of the bone region included in the bone tissue image 14b. The bone quantity information acquired herein is used as the pre-correction bone quantity information.

In order to correct the influence of a change in the contrast of the X-ray image 14 depending on imaging conditions, the bone quantity acquisition unit 13 acquires the bone quantity information converted into the pixel value of the bone region acquired under reference imaging conditions for the pixel value of the bone region included in the bone tissue image 14b. By virtue of this correction, even in the X-ray images 14 captured in the case of different imaging conditions, the bone quantity can be calculated as the X-ray image 14 captured under the reference imaging conditions. Therefore, the comparison or diagnosis can be performed more accurately.

Examples of the influence of the imaging conditions include tube voltage and body thickness. Regarding the tube voltage, the higher the tube voltage applied to the radiation source 42 and the higher the energy of the X-rays, the smaller the contrast between the soft part and the bone part in the X-ray image 14. Additionally, in a process in which X-rays are transmitted through the subject Obj, a low-energy component of the X-rays is absorbed by the subject Obj, resulting in beam hardening in which the energy of the X-rays becomes high. An increase in energy of the X-rays caused by the beam hardening increases as the body thickness of the subject Obj increases.

Figure 15:
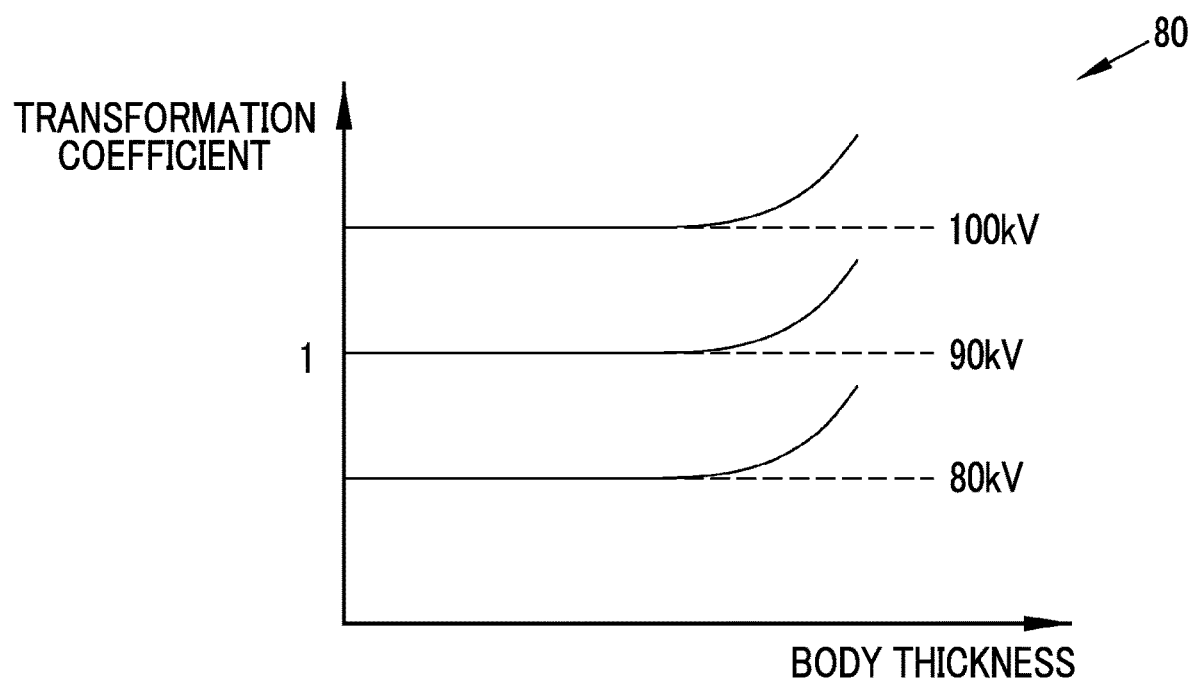
FIG. 15 is a look up table showing transformation coefficients depending on a body thickness and a tube voltage, and showing a case where the tube voltage is 100 kV, 90 kV, or 80 kV, respectively.

The bone quantity acquisition unit 13 obtains the bone quantity on the basis of the body thickness distribution, the pixel value of the bone region, and the imaging conditions in a case where the body thickness distribution and the radiation image are acquired. As shown in FIG. 15, the bone quantity acquisition unit 13 acquires, for each pixel, a transformation coefficient Cb (x, y) for converting a pixel value of the bone region into bone quantity information with reference to the LUT 80. In addition, it is assumed that the body thickness of the subject is associated with each position on an xy plane and the body thickness distribution of the subject is T (x, y). The transformation coefficient Cb (x, y) is determined on the basis of the imaging conditions and the body thickness distribution T (x, y). Then, as shown in Expression (2) below, bone quantity information B (x, y) is acquired for each pixel of the bone region by multiplying a pixel value Gb (x, y) of each pixel of the bone region by the transformation coefficient Cb (x, y).

$$B(x,y)=Cb(x,y)\times G(x,y) \quad (2)$$

The LUT 80 defines a relationship between the body thickness included in the body thickness distribution and the transformation coefficient Cb (x, y). As shown in this relationship, the larger the tube voltage included in the imaging conditions and the larger the body thickness, the larger the value of the transformation coefficient. Even in a case where the imaging conditions vary, comparison, diagnosis, or the like using the bone quantity can be performed more accurately by calculating the bone quantity information in a case where imaging is performed under the reference imaging conditions. Therefore, in a case where the tube voltage under the imaging conditions is a tube voltage of 90 kV, which is a reference imaging condition, the transformation coefficient Cb (x, y) is set to "1" in a case where the thickness is "0".

Similarly, in a case where the tube voltage under the imaging conditions is larger than that under the reference imaging conditions and the tube voltage is 100 kV, the transformation coefficient Cb (x, y) is larger than "1" in a case where the body thickness is "0". This is because the higher the tube voltage, the lower the contrast between the bone part and the soft part. In the present embodiment, the pixel value of the bone part is corrected by using the transformation coefficient with respect to a decrease in contrast. Additionally, in a case where the tube voltage under the imaging conditions is smaller than that under the reference imaging conditions and the tube voltage is 80 kV, the transformation coefficient Cb (x, y) is smaller than "1" in a case where the body thickness is "0". This is because the lower the tube voltage, the higher the contrast between the bone part and the soft part. In the present embodiment, the pixel value of the bone part is corrected by using the transformation coefficient with respect to an increase in contrast.

Figure 16:
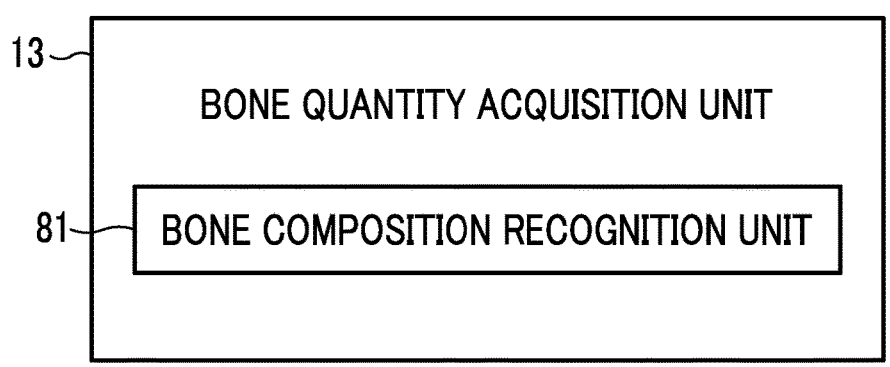
FIG. 16 is a block diagram showing a function of a bone quantity acquisition unit.

Additionally, as the pre-correction bone quantity information, it is preferable to calculate cortical bone quantity information and spongy bone quantity information for each of the cortical bone and the spongy bone in the bone part. In addition, in a case where the bone part does not include any of the cortical bone and the spongy bone, either the cortical bone quantity information or the spongy bone quantity information may be calculated. As shown in FIG. 16, in this case, the bone quantity acquisition unit 13 includes a bone composition recognition unit 81. On the basis of the bone tissue image 14b, the bone composition recognition unit 81 distinguishes between a cortical bone region where the cortical bone is captured in the bone tissue image 14b and a spongy bone region where the spongy bone is captured. As a method of distinguishing and recognizing the cortical bone region and the spongy bone region, a known method can be used, and specific examples thereof include a method of performing filtering processing for specifying the regions.

Figure 17:
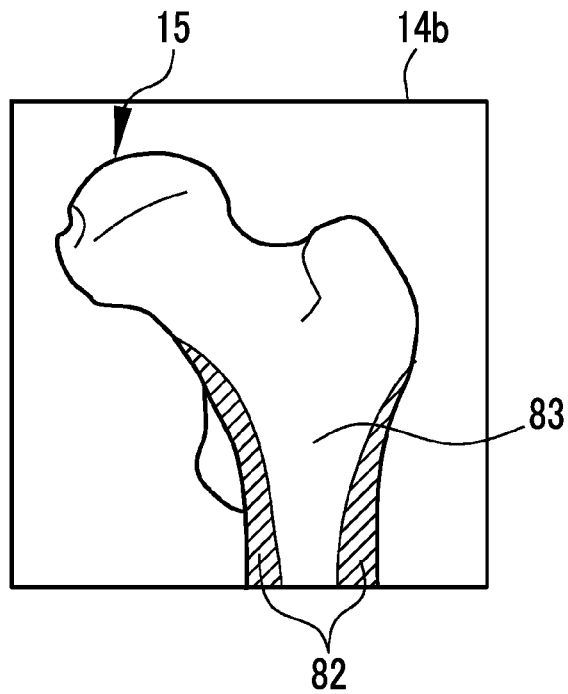
FIG. 17 is an explanatory diagram illustrating a cortical bone and a spongy bone.

As shown in FIG. 17, in the bone tissue image 14b, the cortical bone region 82 that covers the outside of the thighbone 15 and the other spongy bone region 83 are distinguished from each other. The bone quantity acquisition unit 13 calculates each of the cortical bone quantity information and the spongy bone quantity information on the basis of each of the cortical bone region 82 and the spongy bone region 83. The calculated cortical bone quantity information and spongy bone quantity information are used as pre-correction cortical bone quantity information and pre-correction spongy bone quantity information, respectively, and correction is made on the basis of the obtained rotation angle to obtain final measurement values of the cortical bone quantity information and the spongy bone quantity information. The method of performing the correction on the basis of the rotation angle is the same as described above.

The measurement of the cortical bone quantity information and the spongy bone quantity information in a bone part is important for diagnosis or treatment. For example, a method of evaluating the risk of osteoporosis or fracture, such as a Hip Structural Analysis (HSA) or a Trabecular Bone Score (TBS), is used. The cortical bone quantity is used in HSA, and the structure of the spongy bone is used in TBS. Therefore, since the cortical bone quantity information and the spongy bone quantity information at a certain reference can be easily measured by the X-ray image 14, a simple evaluation according to each method can be easily and more accurately performed, which is preferable.

Additionally, in a case where the pixel value is converted into the bone quantity information and in a case where the bone quantity information is converted into the bone quantity, the conversion may be performed after calibration is performed using a phantom in which the composition amount of the bone part is known. It is preferable that the calibration is performed before the X-ray image 14 is captured, and a correction coefficient for correction is acquired regarding a relationship between the pixel value and the bone quantity or a relationship between the bone quantity information and the bone quantity.

In addition, it is preferable to use various types of phantoms depending on applications. Additionally, it is preferable to use a phantom or the like of which the composition is distinguished between the cortical bone and the spongy bone, because it is possible to perform finer calibration by division into the cortical bone or the spongy bone.

A case where a phantom is used in converting the bone quantity information into the bone quantity will be described. The analysis unit 10a acquires bone quantity information on the basis of an X-ray image 14 obtained by performing radiography of a phantom having a known bone quantity. Here, since the acquired bone quantity information is the bone quantity information of a subject of which bone quantity is known, the information is used as a reference value of the bone quantity information.

Next, the bone quantity correspondence information generated by associating the known bone quantity with the reference value of the bone quantity information is acquired. For example, the absolute value of the bone quantity can be obtained by using the bone quantity information obtained from the X-ray image 14 and the bone quantity correspondence information. It is possible to obtain a more accurate measurement value of the bone quantity, for example, in a case where a phantom selected so that a more accurate bone quantity can be calculated depending on the type of a subject, or the like is used. Therefore, a method of using the bone quantity correspondence information is effective regardless of whether the bone quantity information is an absolute value, a relative value, or any value other than the absolute value and the relative value.

In addition, in the above embodiment, the thighbone 15 is used as the bone part. However, the analysis device 10 can similarly measure the bone quantity at a certain reference by correcting the pixel value of the X-ray image 14 based on various positioning to the pixel value in the X-ray image 14 obtained by the positioning of the reference position, even in a case where the bone part used for the examination or diagnosis of osteoporosis such as the forearm or the lumbar spine is targeted.

Additionally, in the above embodiment, the trained model is used to obtain the rotation angle of the X-ray image 14, but the trained model may be used to obtain the bone quantity from the pixel value.

Additionally, in the above embodiment, the bone region and the soft region may be specified or the cortical bone and the spongy bone may be specified, by performing filtering processing for specifying a region on one radiation image. For example, in a case where there is a specific spatial frequency unique to the soft region, it is preferable to specify the soft region through frequency filtering processing of extracting a range of the specific spatial frequency. Alternatively, in a case where the soft region has many low-frequency regions and it is difficult to specify the soft region through the frequency filtering processing of extracting the soft region, the frequency filtering processing of extracting a bone region having a higher frequency than the soft region may be performed on the radiation image. In addition, the soft region may be specified by subtracting a radiation image, which has undergone the frequency filtering processing, from an original radiation image. The same applies to the cortical bone and the spongy bone.

Additionally, in the above embodiment, the pre-correction bone quantity information is corrected on the basis of the rotation angle. However, after a pixel value for each pixel in an acquired X-ray image 14 is corrected on the basis of the rotation angle, the corrected pixel value may be converted into the bone quantity information of the bone part.

Additionally, in the above embodiment, the proximal thighbone part is used as the bone part, but other bone parts may be used. For example, by using a bone part used for diagnosing osteoporosis, a spine that is a bone part prone to fracture, or a distal end of the radius, a time-dependent examination of the osteoporosis can be performed more accurately, which is suitable. Specifically, in order to measure the bone mineral density of the distal end of the radius, the rotation angle of the distal end of the radius may be obtained by using a positional relationship between the radius and the ulnar bone.

In the above embodiment, the hardware structures of processing units, such as the analysis image acquisition unit 11, the rotation angle acquisition unit 12, and the bone quantity acquisition unit 13 included in the analysis device 10, or the image acquisition unit 52, the image processing unit 53, and the radiation image analysis unit 10a, and the body thickness distribution acquisition unit 54 included in the console 41 are various processors as shown below. The various processors include a central processing unit (CPU) that is a general-purpose processor that executes software (programs) to function as various processing units, a programmable logic device (PLD), which is a processor capable of changing the circuit configuration after manufacturing, such as a field programmable gate array (FPGA), a dedicated electric circuit that is a processor having a circuit configuration designed in a dedicated manner to execute various processing, and the like.

One processing unit may be constituted of one of the various processors, or may be constituted of a combination (for example, a plurality of FPGAs or a combination of a CPU and an FPGA) of two or more processors of the same type or different types. Additionally, a plurality of processing units may be constituted of one processor. As an example in which the plurality of processing units is constituted of one processor, firstly, as represented by a computer such as a client or a server, there is a form in which one processor is configured by a combination of one or more CPUs and software and this processor functions as the plurality of processing units. Secondly, as represented by system on chip (SoC), there is a form in which a processor that realizes the functions of the entire system including a plurality of processing units with one integrated circuit (IC) chip is used. In this way, the various processing units are configured using one or more of the various processors as the hardware structure.

Moreover, the hardware structure of the various processors is, more specifically, an electric circuit (circuitry) in a form in which circuit elements such as semiconductor elements are combined together.

EXPLANATION OF REFERENCES

10: radiation image analysis device
10a: radiation image analysis unit
11: analysis image acquisition unit
12: rotation angle acquisition unit
13: bone quantity acquisition unit
14: X-ray image
15: thighbone
15a: region in which white appears dark
15b: region in which white appears light
16: lesser trochanter
17: bone quantity
18: tangential line
19: perpendicular line
21: graph
22: relational expression
31: graph
32, 32a, 32b: relational expression 40: radiography system
41: console
42: radiation source
43: radiography unit
44: first radiation detector
45: second radiation detector
46: X-ray energy conversion filter
47: input unit
48: display
49: RIS
50: PACS
51: HIS
52: image acquisition unit
53: image processing unit
54: body thickness distribution acquisition unit
61: body thickness distribution measurement value acquisition unit
62: body thickness distribution estimation value acquisition unit
63: scattered ray removal unit
71: trained model
72: estimation result
80: LUT
81: bone composition recognition unit
82: cortical bone region
83: spongy bone region
a, a1, a2, a3: distance
G1: first radiation image
G2: second radiation image
Obj: subject
Ra: X-ray
ST110 to ST170: step

What is claimed is:

1. A radiation image analysis device comprising:
a processor configured to:
acquire a radiation image obtained by performing radiography of a subject including a bone part;
convert a pixel value for each pixel of the radiation image to obtain pre-correction bone quantity information of the bone part; and
correct the pre-correction bone quantity information based on a rotation angle to acquire bone quantity information of the bone part, the rotation angle being acquired from a reference position of the bone part on the basis of the radiation image, wherein
the bone part includes a preset part,
the bone part is a right or left proximal thighbone part,
the part is a lesser trochanter, and
the processor is configured to acquire the rotation angle on the basis of a part image of the part captured in the radiation image.

2. The radiation image analysis device according to claim 1,
wherein the radiation image is obtained by imaging the subject at a frontal position.

3. The radiation image analysis device according to claim 1,
wherein the processor is configured to:
obtain a lesser trochanter distance, which is a distance between an apex of the lesser trochanter and a tangential line touching an inside of a thighbone included in the proximal thighbone part, on the basis of the part image; and
acquire the rotation angle on the basis of the lesser trochanter distance.

4. The radiation image analysis device according to claim 3,
wherein the processor is configured to:
acquire rotation angle correspondence information in which the lesser trochanter distance corresponds to the rotation angle; and
acquire the rotation angle on the basis of the lesser trochanter distance and the rotation angle correspondence information.

5. The radiation image analysis device according to claim 1,
wherein the processor is configured to:
acquire correction coefficient correspondence information in which the rotation angle corresponds to a correction coefficient for correcting the pre-correction bone quantity information; and
correct the pre-correction bone quantity information on the basis of the rotation angle and the correction coefficient correspondence information.

6. The radiation image analysis device according to claim 1, further comprising:
a trained model capable of estimating and outputting an estimation result related to the rotation angle by inputting input information including the radiation image,
wherein the trained model has a parameter for outputting the estimation result on the basis of the input information, and
the processor is configured to acquire the rotation angle from the estimation result output by using the trained model.

7. The radiation image analysis device according to claim 1,
wherein the processor is configured to
estimate a scattered ray component for each pixel on the basis of a body thickness distribution of the subject and remove the scattered ray component from the radiation image, in a case where the radiation image is acquired.

8. The radiation image analysis device according to claim 1,
wherein the bone part includes a cortical bone and a spongy bone, and
the processor is configured to:
recognize a region of the cortical bone and a region of the spongy bone in the bone part captured in the radiation image;
acquire pre-correction cortical bone quantity information on the basis of the region of the cortical bone and acquire pre-correction spongy bone quantity information on the basis of the region of the spongy bone; and
acquire cortical bone quantity information by correcting the pre-correction cortical bone quantity information on the basis of the rotation angle and acquire spongy bone quantity information by correcting the pre-correction spongy bone quantity information on the basis of the rotation angle.

9. The radiation image analysis device according to claim 1,
wherein the processor is configured to:
acquire a reference value of the bone quantity information on the basis of the radiation image obtained by performing radiography of a phantom having a known bone quantity;
acquire bone quantity correspondence information in which the known bone quantity corresponds to the reference value of the bone quantity information; and
acquire the bone quantity from the bone quantity information on the basis of the bone quantity correspondence information.

10. A method of operating a radiation image analysis device, comprising:
- a step of acquiring a radiation image obtained by performing radiography of a subject including a bone part;
- a step of converting a pixel value for each pixel of the radiation image to obtain pre-correction bone quantity information of the bone part; and
- a step of correcting the pre-correction bone quantity information based on a rotation angle to acquire bone quantity information of the bone part, the rotation angle being acquired from a reference position of the bone part on the basis of the radiation image, wherein the bone part includes a preset part, the bone part is a right or left proximal thighbone part, the part is a lesser trochanter, and the method further comprises a step of acquiring the rotation angle on the basis of a part image of the part captured in the radiation image.

11. A non-transitory computer readable medium for storing a computer-executable program for analyzing a radiation image, the computer-executable program causing a computer to execute:
- a function of acquiring a radiation image obtained by performing radiography of a subject including a bone part;
- a function of converting a pixel value for each pixel of the radiation image to obtain pre-correction bone quantity information of the bone part; and
- a function of correcting the pre-correction bone quantity information based on a rotation angle to acquire bone quantity information of the bone part, the rotation angle being acquired from a reference position of the bone part on the basis of the radiation image, wherein the bone part includes a preset part, the bone part is a right or left proximal thighbone part, the part is a lesser trochanter, and the computer-executable program further causes the computer to execute a function of acquiring the rotation angle on the basis of a part image of the part captured in the radiation image.

* * * * *